(12) United States Patent
Niu et al.

(10) Patent No.: US 12,299,609 B1
(45) Date of Patent: May 13, 2025

(54) DYNAMICALLY TRANSMITTING ONLINE MODE INVITATIONS TO PROVIDER DEVICES IN RESPONSE TO DETECTED CHANGES IN PROVIDER DEVICE EFFICIENCY

(71) Applicant: Lyft, Inc., San Francisco, CA (US)

(72) Inventors: Mengqi Niu, San Francisco, CA (US); Wilson James Turner, Dedham, MA (US); Mayank Gulati, San Francisco, CA (US); John Torres Fremlin, New york, NY (US); Aidan John Church, San Francisco, CA (US); Garrett John van Ryzin, Brooklyn, NY (US)

(73) Assignee: Lyft, Inc., San Francisco, CA (US)

( * ) Notice: Subject to any disclaimer, the term of this patent is extended or adjusted under 35 U.S.C. 154(b) by 591 days.

(21) Appl. No.: 16/992,827

(22) Filed: Aug. 13, 2020

(51) Int. Cl.
*G06Q 10/0631* (2023.01)
*H04W 4/021* (2018.01)

(52) U.S. Cl.
CPC ...... *G06Q 10/06311* (2013.01); *H04W 4/021* (2013.01)

(58) Field of Classification Search
CPC .. G06Q 10/06311; G06Q 50/40; G06Q 10/06; G06Q 10/02; H04W 4/021; H04L 47/83; H04L 47/822
(Continued)

(56) References Cited

U.S. PATENT DOCUMENTS 9,215,559 B2 * 12/2015 Dave ..................... H04W 4/023
11,250,531 B2 * 2/2022 Dicker ............... G06Q 30/0208
(Continued)

FOREIGN PATENT DOCUMENTS

AU  2016208350 A1 * 8/2016  ............. G06Q 50/28
CN  110959162 A  * 4/2020  ............. G06Q 10/02
(Continued)

OTHER PUBLICATIONS

Arslan, Alp and Agatz, Niels A.H. and Kroon, Leo and Zuidwijk, Rob A., Crowdsourced Delivery: A Dynamic Pickup and Delivery Problem with Ad-Hoc Drivers (Sep. 5, 2016). ERIM Report Series Reference, Available at SSRN: https://ssrn.com/abstract=2726731 or http://dx.doi.org/10.2139/ssrn.2726731 (Year: 2016).*
(Continued)

*Primary Examiner* — Patricia H Munson
*Assistant Examiner* — Thea Labogin
(74) *Attorney, Agent, or Firm* — Keller Preece PLLC

(57) ABSTRACT

The present application discloses systems, methods, and computer-readable media that utilize computer-implemented models to monitor surplus provider device slots and transmit digital invitations to provider devices to join an online mode by dynamically leveraging previous transportation provider device requests within a threshold rejection time span. For instance, the disclosed systems can identify rejected provider devices that requested to be in an online mode of a transportation matching application within a geographical area. Then the disclosed systems can monitor device activity over computer networks and determine a number of surplus provider device slots corresponding to the geographical region. Furthermore, the disclosed systems can select provider devices (that were rejected within a threshold rejection time span) from the previously rejected requests. Furthermore, the disclosed systems can transmit digital invitations to join the online mode to selected provider devices with a guaranteed online mode slot for a threshold reservation time.

20 Claims, 14 Drawing Sheets

(58) Field of Classification Search
USPC .......................................................... 705/7.13
See application file for complete search history.

(56) References Cited

U.S. PATENT DOCUMENTS

| | | | |
|---|---|---|---|
| 11,928,713 | B2 | 3/2024 | Gulati et al. |
| 2018/0108103 | A1* | 4/2018 | Li ........................... G06Q 20/18 |
| 2018/0341895 | A1* | 11/2018 | Kislovskiy ....... G06Q 10/06313 |
| 2020/0082315 | A1* | 3/2020 | Crapis .............. G06Q 10/06311 |
| 2021/0192420 | A1 | 6/2021 | Spielman et al. |
| 2021/0192583 | A1 | 6/2021 | Gulati et al. |
| 2021/0192584 | A1 | 6/2021 | Spielman et al. |
| 2021/0192663 | A1 | 6/2021 | Spielman et al. |
| 2023/0120345 | A1 | 4/2023 | Demiralp et al. |

FOREIGN PATENT DOCUMENTS

| | | | | |
|---|---|---|---|---|
| DE | 112022001500 T5 * | 1/2024 | ......... | G01C 21/3438 |
| WO | WO-2019015450 A1 * | 1/2019 | ............. | G06Q 10/02 |

OTHER PUBLICATIONS

Rosenblat, Alex and Stark, Luke, Algorithmic Labor and Information Asymmetries: A Case Study of Uber's Drivers (Jul. 30, 2016). International Journal of Communication, 10, 27. , Available at SSRN: https://ssrn.com/abstract=2686227 or http://dx.doi.org/10.2139/ssrn.2686227 (Year: 2016).*

Reyes, Damian, et al. "The meal delivery routing problem." Optimization Online 6571 (2018): 2018. (Year: 2018).*

* cited by examiner

US 12,299,609 B1

DYNAMICALLY TRANSMITTING ONLINE MODE INVITATIONS TO PROVIDER DEVICES IN RESPONSE TO DETECTED CHANGES IN PROVIDER DEVICE EFFICIENCY

BACKGROUND

Recent years have seen significant development in transportation matching systems that utilize web and mobile applications to match provider devices to real-time on-demand transportation requests from requestor devices. For example, on-demand transportation matching systems can utilize computer networks to match provider devices with requestor devices to provide transportation across a variety of geographical locations and contexts. Although conventional transportation matching systems can dynamically match provider devices and requestor devices utilizing distributed computing systems across computer networks, such systems face a number of technical shortcomings, particularly with regard to efficiency, accuracy, and flexibility. This is particularly true in geographical regions that include limits on the number of provider device slots or provider device efficiency metrics at any particular time.

SUMMARY

The disclosure describes one or more embodiments of systems, methods, and non-transitory computer readable media that provide benefits and solve one or more of the foregoing or other problems in the art. In particular, the disclosed systems can utilize various computer models to monitor surplus provider device slots within a geographical area and transmit digital invitations to join an online mode within a transportation matching application by dynamically leveraging previous transportation provider device digital requests within a threshold rejection time span to join the online mode. For instance, the disclosed systems can identify provider devices that requested to join an online mode within a geographical area (and were rejected). The disclosed systems can dynamically analyze transportation requests and efficiency metrics in the geographical area to identify surplus provider device slots. Subsequently, the disclosed systems can select provider devices from previously rejected requests and invite these provider devices to join an online mode within the geographical area.

As an example, the disclosed systems can select provider devices that were rejected within a threshold rejection time span (e.g., 15 minutes) to satisfy the number of surplus provider device slots. Indeed, the disclosed systems can transmit digital invitations to these selected provider devices with a guaranteed online mode slot for a threshold reservation time. By leveraging previous provider device online mode requests within a threshold rejection time span for digital invitations to join an online mode within a transportation matching application, the disclosed systems can improve efficiency, accuracy and flexibility of implementing systems in responding to digital requests from requestor devices within a geographical area.

Additional features and advantages of one or more embodiments of the present disclosure will be set forth in the description which follows.

BRIEF DESCRIPTION OF THE DRAWINGS

The detailed description is described with reference to the accompanying drawings in which.

DETAILED DESCRIPTION

Figure 1:
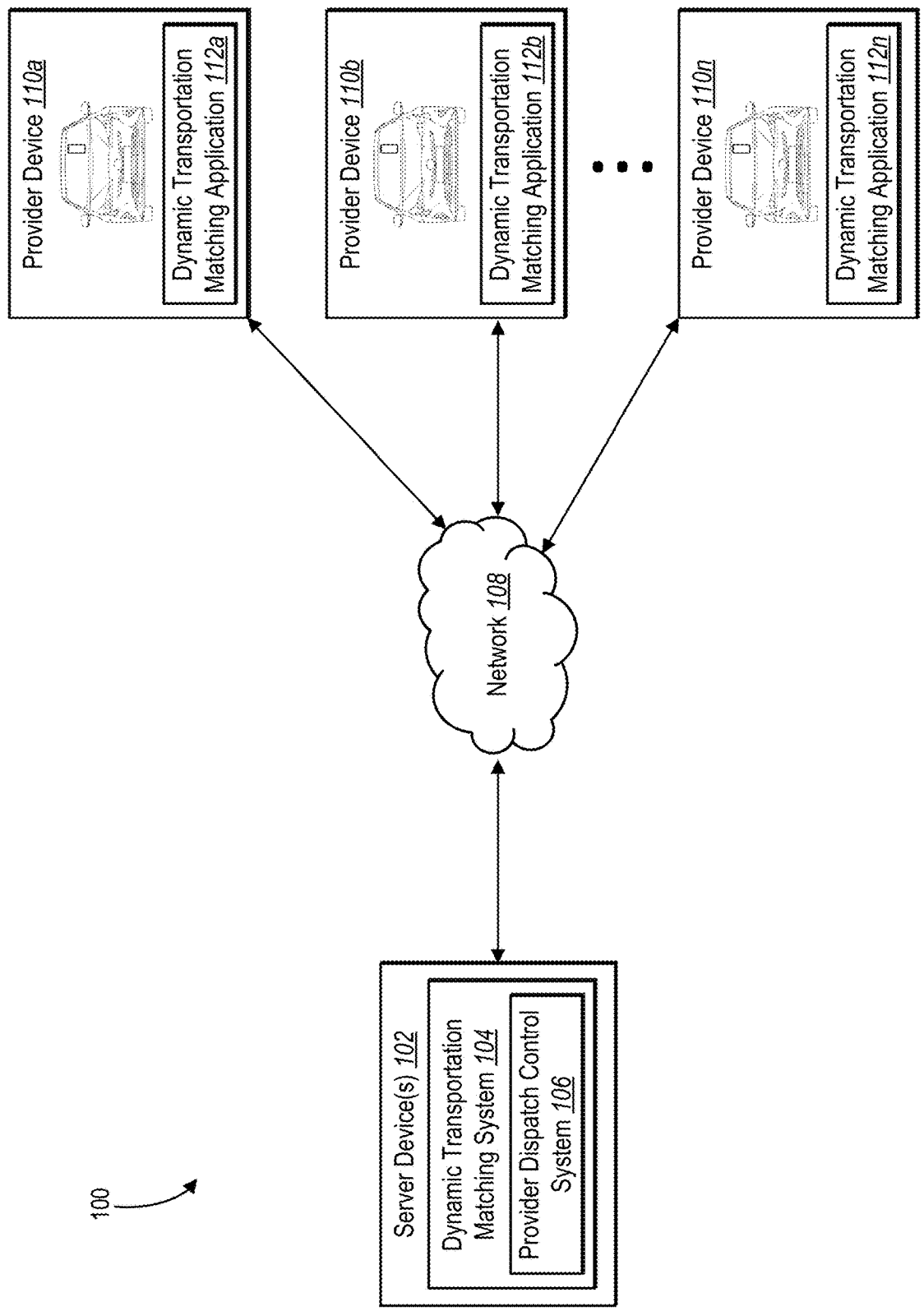
FIG. 1 illustrates a block diagram of an environment for implementing a provider dispatch control system in accordance with one or more embodiments.

The disclosure describes one or more embodiments of a provider dispatch control system that can utilize various computer models to monitor surplus provider device slots within a geographical area and transmit digital invitations to join an online mode by dynamically leveraging previous transportation provider device requests within a threshold rejection time span. Indeed, to satisfy provider device efficiency requirements, the provider dispatch control system can utilize computer models to impose strict limits with regard to the number of available provider device slots (and the number of provider devices in an online mode) relative to requestor devices submitting transportation requests. Thus, the provider dispatch control system can receive requests to join an online mode within a geographical region (and reject provider devices that exceed the number of available provider device slots). Subsequently, the provider dispatch control system can monitor digital activity within the geographical region and identify a number of surplus provider device slots for the online mode (due to a determined change in transportation requests from requestor devices). Furthermore, the provider dispatch control system can select a subset of provider devices for the number of surplus provider device slots from a set of provider devices that were previously rejected. In some embodiments, the provider dispatch control system selects provider devices (for the subset of provider devices) that were previously rejected by applying a threshold rejection time span. Upon selecting the subset of provider devices, the provider dispatch control system can transmit a digital invitation to join the online mode within the geographical area to the subset of provider devices.

As just mentioned, the provider dispatch control system can identify a set of provider devices that are rejected by a dynamic transportation matching system (e.g., provider devices corresponding to rejected requests to join an online mode within a geographical area). For example, the provider dispatch control system can determine that a threshold number of available online mode slots have been filled and reject the remaining provider devices that have submitted requests to join the online mode. In addition, the provider dispatch control system can monitor activity within the geographical area to identify a number of surplus provider device slots for the online mode (at a time instance). For instance, the provider dispatch control system can utilize provider device idle times and pickup travel times to determine changes in provider device efficiency and corresponding fluctuations in available provider device slots. In some embodiments, the provider dispatch control system reacts to the identified change in demand by inviting provider devices for the online mode when the number of surplus provider device slots satisfies a surplus slot threshold.

For example, the provider dispatch control system can select a subset of provider devices (from the set of provider devices corresponding to rejected requests) to invite to join an online mode in the geographical area. In one or more embodiments, the provider dispatch control system selects provider devices for the subset of provider devices that were rejected within a threshold rejection time span (prior to the time instance). In addition, the provider dispatch control system can also identify last known locations of provider devices and select provider devices for the subset of provider devices when the last known locations are within the geographical area.

Moreover, in some embodiments, the provider dispatch control system can utilize performance metrics corresponding to provider devices and/or a score threshold-surplus slot model to select the provider devices for the subset of provider devices. Indeed, in one or more embodiments, the provider dispatch control system ranks provider devices to select the subset of provider devices when there are more candidate provider devices than the number of surplus provider device slots available. Additionally, the provider dispatch control system can utilize a monitored throughput rate and/or a utilization-efficiency-buffer to further limit the number of provider devices selected for an invitation to join the online mode in the geographical area.

Upon selecting the subset of provider devices, the provider dispatch control system can transmit a digital invitation (to the subset of provider devices) to join the online mode within the geographical area. In some embodiments, the provider dispatch control system guarantees (or reserves) an online mode slot for a threshold reservation time for the subset of provider devices upon transmitting the digital invitation to the subset of provider devices. Indeed, the provider dispatch control system can transmit the digital invitations for display as push notifications on the provider devices. Upon receiving a user interaction with the digital invitation from a particular provider device, the provider dispatch control system can switch the particular provider device to an online mode in the geographical area so that the particular provider device can receive transportation requests in the geographical area. Indeed, the provider dispatch control system can identify a number of surplus provider device slots, select provider devices from previously rejected provider devices for the surplus provider device slots, and transmit digital invitations to dynamically (e.g., in real time) address rapid changes in demand (or the supply state) in a geographical area with speed, accuracy, and efficiency.

As mentioned above, although conventional transportation matching systems can match transportation requests to available transportation providers, such systems often face a number of technical shortcomings, particularly with regard to efficiency, accuracy, and flexibility of operation. For instance, due to the complexity and size of many conventional transportation matching systems, these conventional systems often experience rapid (and variable) changes in digital requests across computer networks from requestor devices. As a consequence of these rapid changes, many conventional transportation matching systems inefficiently utilize computer resources in identifying and matching available transportation providers. This is particularly true in geographical areas that place strict limits on provider device efficiency (e.g., regions with local provider device regulations that require passengers a threshold amount of time). Conventional systems require excessive computer resources to monitor and track these limits while identifying and matching available transportation providers. For example, conventional transportation matching systems often expend computing resources to search through an extensive number of transportation providers in an effort to introduce transportation providers to improve the efficiency of matching transportation requests (often without success).

Moreover, conventional transportation matching systems are often inaccurate. For example, due to rapid changes in digital requests across computer networks from requestor devices, many conventional transportation matching systems are unable to accurately anticipate and respond to these digital requests. In some instances, during a sudden increase in transportation requests, conventional transportation matching systems fail to identify sufficient provider devices to efficiently and quickly respond to the surge in digital requests. Imbalances between requestor devices and provider devices from inaccurate analyses can lead to further computational inefficiencies. Indeed, such imbalances often lead to excessive queries, cancellation requests, repetitive application of digital matching algorithms, transmission of duplicate ride requests, and increased demand on available computing resources.

In addition, many conventional transportation matching systems are rigid and unable to quickly and efficiently respond to rapid changes in digital transportation requests from requestor devices. For instance, as mentioned above, conventional transportation matching systems often utilize excessive computing resources to search for additional provider devices in an attempt to handle changes in digital transportation requests and/or prolonged transportation request matching times. Oftentimes, such search attempts are ineffective and time consuming. This is particularly true when conventional systems have strict limits on provider device efficiency, because conventional systems are rigid and slow in adjusting to changed conditions in the face of these limits.

The provider dispatch control system can provide numerous advantages, benefits, and practical applications relative to conventional systems. For instance, the provider dispatch control system is more efficient compared to many conventional transportation matching systems. In particularly, the provider dispatch control system can dynamically react to rapid (and variable) changes in transportation requests from requestor devices to efficiently utilize transportation providers and maintain more optimal transportation matching times and reduced idle times for transportation providers. Furthermore, by actively monitoring and leveraging previously rejected provider device online mode requests for digital invitations to join an online mode, the provider dispatch control system can address rapid changes in transportation requests from requestor devices without expending significant computational resources. Indeed, in contrast to conventional systems that expend computing resources to search through an extensive number of transportation providers, the provider dispatch control system can quickly and efficiently identify provider devices by applying a threshold rejection time span to a set of previously rejected provider devices. The provider dispatch control system can then transmit digital inventions to a subset of these provider devices to quickly and efficiently address rapid (and variable) changes in transportation requests from requestor devices.

Furthermore, the provider dispatch control system can improve accuracy relative to conventional systems. Indeed, as just discussed, the provider dispatch control system can quickly and accurately react to rapid (and variable) changes in requestor devices by leveraging previous provider device online mode requests in the geographical area to invite provider devices that are more likely to join an online mode within the geographical area. Accordingly, the provider dispatch control system can accurately introduce a sufficient number of provider devices in a geographical area to address rapid changes in that area. Due to the ability to quickly and accurately react to changes, the provider dispatch control system can reduce imbalances between requestor devices and transportation devices and further reduce computational resources that result from such imbalances (e.g., reduce digital queries, digital cancellation requests, repetitive application of digital matching algorithms, transmission of duplicate ride requests, and other digital communications that place excessive demands on implementing computing systems).

In addition, the provider dispatch control system can also improve flexibility of implementing systems. Indeed, by leveraging previously rejected provider device online mode requests for digital invitations to join an online mode in a geographical area, the provider dispatch can more flexibly respond to changes in requestor devices, even in regions that include strict limits on provider device efficiency. More specifically, the provider dispatch control system can utilize a variety of computer-implemented algorithms to flexibly adjust available provider device slots in response to changes in transportation request. The provider dispatch control system can also more flexibly identify provider devices to invite to join an online mode in the geographical area.

As indicated by the foregoing discussion, the present disclosure utilizes a variety of terms to describe features and advantages of the provider dispatch control system. For example, as used herein, the term "online mode" refers to a state in which a provider device is enabled to fulfill transportation requests. In particular, the term "online mode" can refer to a state of a transportation matching application in which a provider device can receive and/or fulfill transportation requests. For instance, the provider dispatch control system can place a provider device in an online mode for a geographic area to enable the provider device to operate in the geographic area (e.g., receive and/or fulfill transportation requests).

Additionally, as used herein, the term "offline mode" refers to a state in which a provider device is unable to (or prevented/precluded) from receiving and/or fulfilling transportation requests. In particular, an offline mode can refer to a state of a transportation matching application in which a provider device is prohibited from receiving and/or fulfilling transportation requests. For example, the provider dispatch control system can place a provider device in an offline mode for a geographic area to exclude the provider device from receiving and/or fulfilling transportation requests in the geographic area via the dynamic transportation matching application. The provider dispatch control system can switch provider devices between an online mode and an offline mode (or vice versa) within a geographic area.

As used herein, the term "provider device slot" refers to an assignable opening within an online mode. As described in greater detail below, the provider dispatch control slot can fill provider device slots by sending digital invitations to provider devices to join an online mode. Similarly, as used herein, the term "surplus provider device slot" (or sometimes referred to as "surplus slot") refers to an additional (or a supplementary) provider device slot (e.g., a surplus opening for a provider device to be assigned to an online mode). In particular, the term "surplus provider device slot" can refer to an additional opening that enables an additional provider device to switch to an online mode within the geographical area (while still satisfying provider device limits or requirements within the geographical area). For example, a surplus provider device slot can include an assignable allocation for a provider device to switch to an online mode within a geographical area (while still satisfying provider device efficiency requirements within the geographical area).

As used herein, the term "rejection time span" (or sometimes referred to as "rejection time") refers to a measure indicating time that has elapsed after rejecting a request from a provider device to join an online mode. A rejection time span can be measured from a variety of events. For example, a rejection time span can reflect the time that has elapsed from transmission/receipt of a request to join an online mode, from transmission/receipt of a rejection to the request, from a determination that the request cannot be accepted, or another time corresponding to rejection of the request. For example, the provider dispatch control system can, at 8:40 pm, determine a rejection time span of ten minutes for a provider device that was rejected from joining an online mode in a geographical area at 8:30 pm.

Furthermore, as used herein, the term "digital invitation" refers to a communication to a provider device to join an online mode. In particular, the term "digital invitation" can refer to a communication transmitted to a provider device (for display on the provider device) to provide an option to join (or switch to) an online mode for a particular geographical area. For instance, the provider dispatch control system can transmit a digital invitation to a provider device such that the provider device displays an option to join an online mode and, further, causes the provider dispatch control system to switch the provider device to the online mode upon detecting (or receiving) a user interaction with the option to join (e.g., selecting an acceptance button). As an example, the provider dispatch control system can transmit a digital invitation for display as a push notification within a provider device and, upon receiving a user interaction with the push notification, the provider dispatch control system can switch the provider device from an offline mode to an online mode within a geographical area.

Turning now to the figures, FIG. 1 illustrates a schematic diagram of a system 100 (or environment) in which a provider dispatch control system 106 can operate in accordance with one or more embodiments. As shown in FIG. 1, the system 100 includes server device(s) 102, a dynamic transportation matching system 104, the provider dispatch control system 106, provider devices 110a-110n, and a network 108. As further illustrated in FIG. 1, the server device(s) 102 and the provider devices 110a-110n can communicate via the network 108. Although FIG. 1 illustrates the provider dispatch control system 106 being implemented by a particular component and/or device within the system 100, the provider dispatch control system 106 can be implemented, in whole or in part, by other computing devices and/or components in the system 100.

As shown in FIG. 1, the server device(s) 102 can include the dynamic transportation matching system 104 which further includes the provider dispatch control system 106. In particular, the provider dispatch control system 106 can transmit digital invitations to join an online mode in response to changes in demand within a geographical area by leveraging previous transportation provider device requests. Indeed, the provider dispatch control system 106 can select provider devices and transmit digital invitations to join an online mode to those provider devices in accordance with one or more embodiments herein.

As mentioned above and as shown in FIG. 1, the system 100 includes the provider devices 110a-110n. In one or more embodiments, the provider devices 110a-110n may include, but are not limited to, mobile devices (e.g., smartphones, tablets) or any other type of computing devices, including those explained below with reference to FIGS. 10 and/or 11. Indeed, the provider devices 110a-110n can include computing devices associated with (and/or operated by) providers or transportation vehicles (e.g., transportation vehicles of providers or autonomous vehicles). Moreover, the system 100 can include any number of provider devices.

In addition, as shown in FIG. 1, each of the provider devices 110a-110n include dynamic transportation matching applications 112a-112n. In some embodiments, the dynamic transportation matching applications 112a-112n can comprise instructions that (upon execution) cause the provider devices 110a-110n to perform various actions for a dynamic transportation matching system, as described herein. Such instructions may cause a provider device to present dispatch instructions (e.g., via a graphical user interface displaying navigation information and/or online or offline status) for a vehicle associated with the provider device in accordance with one or more embodiments herein. Furthermore, such instructions may likewise cause a provider device to present graphical user interfaces including digital invitations to switch to an online mode in a geographical area.

Moreover, although not illustrated, the system 100 can include requestor devices. For example, requestor devices may include, but are not limited to, mobile devices (e.g., smartphones, tablets) or any other type of computing devices, including those explained below with reference to FIGS. 10 and/or 11. Additionally, the requestor devices can include computing devices associated with (and/or operated by) requestors for transportation requests (or other services). Also, the requestor devices can include dynamic transportation matching applications which can include instructions that (upon execution) cause the requestor devices to perform various actions for the dynamic transportation matching system. For example, in reference to FIG. 1, a requestor device can operate the transportation matching application on the requestor device to transmit a transportation request to the provider dispatch control system 106 (via the network 108). Moreover, the system 100 can include any number of requestor devices.

As an overview of the system 100, in one or more embodiments, the provider dispatch control system 106 can, determine provider device slots based on efficiency metrics of a geographical region. The provider dispatch control system 106 can fill the provider device slots based on requests from the provider devices 110a-110n. The provider dispatch control system 106 can also reject requests from among the provider devices 110a-110n. The provider dispatch control system 106 can identify a number of surplus provider device slots for the online mode within the geographical are and select a subset of provider devices for the number of surplus provider device slots from the provider devices 110a-110n that were previously rejected. Finally, the provider dispatch control system 106 can transmit digital invitations to join the online mode (within the geographical area) to this subset of provider devices.

Furthermore, a requestor device can transmit a transportation request (e.g., including a pickup location and destination location) to the provider dispatch control system 106. Upon receiving the transportation request, the provider dispatch control system 106 can utilize information corresponding to the transportation request and the provider devices 110a-110n (that are in an online mode for the geographical area associated with the transportation request) to select a provider device for the transportation request. Then, the provider dispatch control system 106 can transmit the transportation request to the selected provider device (from the provider devices 110a-110n that are in an online mode) to fulfill the transportation request.

In one or more embodiments, the provider devices 110a-110n (or requestor devices) correspond to one or more user accounts (e.g., user accounts stored at the server device(s) 102). For example, a user of a provider device can establish a user account with login credentials and a provider of the provider device can establish a provider account with login credentials. These user accounts can include a variety of information regarding requestors/providers, including user information (e.g., name, telephone number, etc.), vehicle information (e.g., vehicle type, license plate number), device information (e.g., operating system, memory or processing capability), payment information, purchase history, transportation history, etc. Different account can also include various privileges associated with requestors and providers (e.g., privileges to access certain functionality via the transportation matching application, to provide transportation services, to submit transportation requests, etc.). The dynamic transportation matching system 104 can manage the provider devices 110a-110n (and requestor devices) based on appropriate privileges associated with the corresponding user accounts (e.g. provider accounts and/or requestor accounts). Accordingly, providers (and/or requestors) can utilize multiple devices (e.g., multiple provider devices or multiple requestor devices) with the appropriate privileges associated with the corresponding accounts.

The present disclosure utilizes provider devices (and requestor devices) to refer to devices associated with these user accounts. Thus, in referring to a provider device (or a requestor device), the disclosure and the claims are not limited to communications with a specific device, but any device corresponding to an account of a particular user. Accordingly, in using the term provider device, this disclosure refers to any computing device corresponding to a provider account. Similarly, in using the term requestor device, this disclosure refers to any computing device corresponding to a requestor account.

Additionally, as shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIGS. 10 and/or 11. Furthermore, although FIG. 1 illustrates the server device(s) 102 and the provider device(s) 110*a*-110*n* communicating via the network 108, the various components of the system 100 can communicate and/or interact via other methods (e.g., the server device(s) 102 and the provider devices 110*a*-110*n* can communicate directly).

Figure 2:
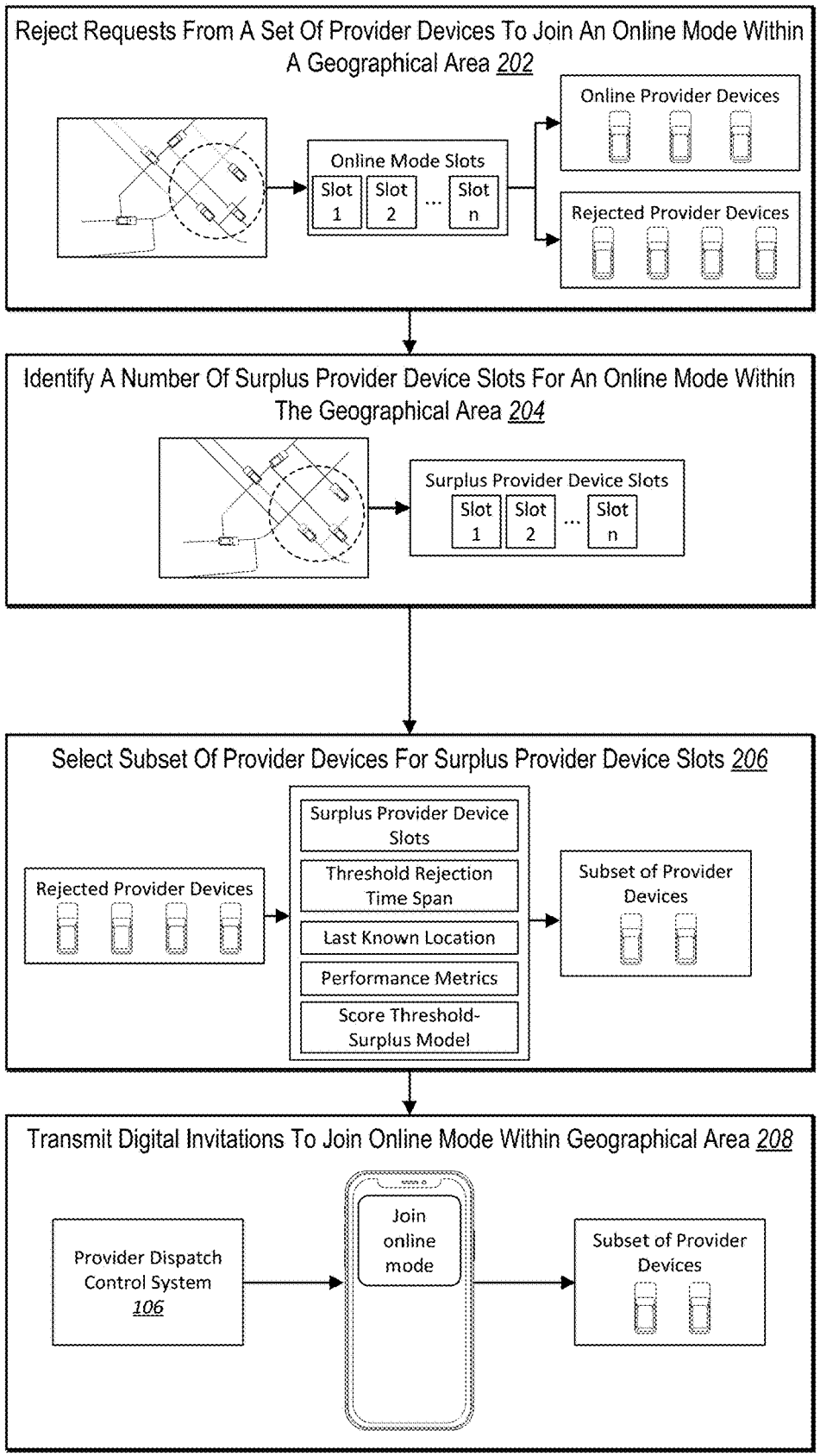
FIG. 2 illustrates an overview diagram of the provider dispatch control system transmitting digital invitations to join an online mode to rejected provider devices in accordance with one or more embodiments.

As mentioned above, the provider dispatch control system 106 can transmit digital invitations to join an online mode in response to changes in demand within a geographical area by leveraging previous transportation provider device requests. In particular, FIG. 2 illustrates an overview of the provider dispatch control system 106 selecting provider devices and transmitting digital invitations to join an online mode in accordance with one or more embodiments. For instance, as shown in FIG. 2, the provider dispatch control system 106 rejects requests from a set of provider devices to join an online mode within a geographical area (to identify a set of provider devices that are rejected) and (subsequently) identifies a number of surplus provider device slots for the online mode within the geographical area. Then, as illustrated in FIG. 2, the provider dispatch control system 106 selects a subset of provider devices for the surplus provider device slots (from a set of rejected provider devices) and transmits digital invitations to join the online mode within the geographical area.

For example, as shown in FIG. 2, the provider dispatch control system 106 rejects requests from a set of provider devices to join an online mode within a geographical area in an act 202. In particular, the provider dispatch control system 106 can determine a number of online mode slots for a geographical area (e.g., based on a transportation request demand at a given time). Furthermore, the provider dispatch control system 106 can select provider devices for the online mode slots from provider devices that request to join an online mode within the geographical area. As shown in FIG. 2, by selecting provider devices for the online mode slots, the provider dispatch control system 106 determines provider devices that are online within the geographical area and also identifies other provider devices that were rejected (for the online mode) in the geographical area (as the identified set of provider devices that are rejected). Additional detail regarding online mode slots and the identification of provider devices that correspond to rejected requests for the online mode slots is provided below (e.g., in relation to FIG. 3).

Furthermore, as illustrated in FIG. 2, the provider dispatch control system 106 identifies a number of surplus provider device slots for the online mode within the geographical area in an act 204. For instance, the provider dispatch control system 106 can determine a change in transportation request demand within the geographical area. As shown in FIG. 2, in order to respond to the change in transportation request demand, the provider dispatch control system 106 can determine a number of surplus provider device slots to introduce additional provider devices in the geographical area (at a time instance). Indeed, the provider dispatch control system 106 can determine the change in transportation request demand using various combinations of information monitored within the geographical area (e.g., idle times, transportation requests, pickup travel times). Additional detail regarding the identification of surplus provider device slots for an online mode is provided below (e.g., in relation to FIG. 4).

Moreover, as illustrated in FIG. 2, the provider dispatch control system 106 selects a subset of provider devices for the surplus provider device slots in an act 206. For instance, as shown in FIG. 2, the provider dispatch control system 106 selects a subset of provider devices from the previously rejected provider devices (i.e., the set of provider devices that were rejected) to invite to the online mode. Furthermore, as shown in FIG. 2, the provider dispatch control system 106 can utilize rejection times corresponding to the rejected provider devices and a threshold rejection time span (prior to the time instance) to select the subset of provider devices (e.g., to fill the surplus provider device slots). In some embodiments, as shown in FIG. 2, the provider dispatch control system 106 utilizes various combinations of other information (e.g., last known locations of provider devices, performance metrics of provider devices, and/or a score threshold-surplus model) to rank and/or select the subset of provider devices from the rejected provider devices. Additional detail regarding the selection of a subset of provider devices for the surplus provider device slots is provided below (e.g., in relation to FIGS. 5 and 6).

In addition, as shown in FIG. 2, the provider dispatch control system 106 transmits digital invitations to join the online mode within the geographical area in an act 208. In particular, as shown in FIG. 2, the provider dispatch control system 106 sends the digital invitations to join the online mode to the subset of provider devices that were selected from the rejected provider devices (in the act 206) for the surplus provider device slots. The provider dispatch control system 106 can switch a provider device from the subset of provider devices to an online mode within the geographical area upon receiving a user interaction with the digital invitation from the provider device. Additional detail regarding the transmission of digital invitations to join an online mode is provided below (e.g., in relation to FIG. 7).

Figure 3:
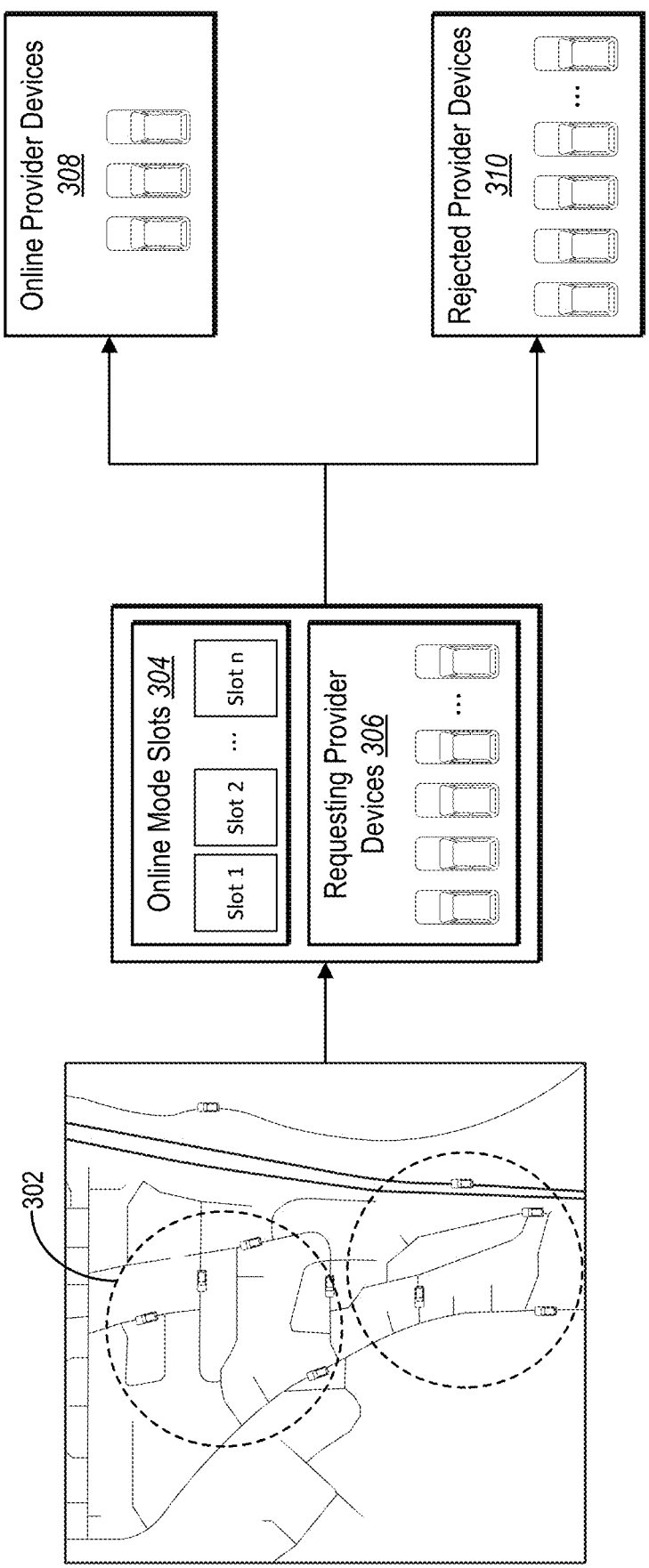
FIG. 3 illustrates a diagram of the provider dispatch control system determining online mode slots and rejecting one or more provider devices for the online mode slots in accordance with one or more embodiments.

As mentioned above, the provider dispatch control system 106 can determine slots for an online mode in a geographical area. Additionally, as previously mentioned, the provider dispatch control system 106 can receive requests (from provider devices) to join the online mode in the geographical area and reject one or more of the requests to join. For example, FIG. 3 illustrates the provider dispatch control system 106 determining online mode slots and receiving requests (and rejecting requests) from requesting provider devices within a geographical area. Indeed, as shown in FIG. 3, the provider dispatch control system 106 determines a number of online mode slots 304 for a geographical area 302. In addition, as shown in FIG. 3, the provider dispatch control system 106 receives requests to join the online mode from requesting provider devices 306 corresponding to the geographical area 302.

Furthermore, as illustrated in FIG. 3, the provider dispatch control system 106 selects provider devices from the requesting provider devices 306 for the online mode slots 304 to obtain a set of online provider devices 308. Additionally, the provider dispatch control system 106 rejects (or does not respond to) provider device requests from one or more of the requesting provider devices 306 to obtain (or identify) a set of rejected provider devices 310. Indeed, the set of rejected provider devices 310 can include provider devices corresponding to rejected requests and/or corresponding to requests that were not considered. Furthermore, in reference to FIG. 3, the provider dispatch control system 106 can determine online provider devices and rejected provider devices for a number of geographical areas (e.g., multiple geographical areas are shown in the map illustrated in FIG. 3 as having separate boundaries).

Indeed, the provider dispatch control system 106 can receive requests to join various types of online modes for various types of transportation matching systems (or transportation dispatch modes). For instance, the provider dispatch control system 106 can receive a request to join an online mode slot for a slot to service transportation requests within a geographical area (e.g., to be eligible to receive transportation requests in the geographical area). In some embodiments, the provider dispatch control system 106 can receive requests to join an online mode slot that corresponds to a shift associated with the geographical area. In particular, the provider device requests can include requests to be assigned to a transportation service shift (e.g., having a time and start location) within the geographical area.

Additionally, the provider dispatch control system 106 can also receive provider device requests to join an online mode slot corresponding to a priority dispatch mode within a geographical area. For instance, the provider dispatch control system 106 can receive requests to join an online mode slot that prioritizes a provider device corresponding to the slot in relation to assigning transportation requests. Indeed, the provider dispatch control system 106 can reject provider devices for these various types of online modes and, subsequently, leverage the rejected provider devices by transmitting digital invitations to join the various online modes as a reaction to changes in transportation request demand (or other factors) within a geographical area.

In one or more embodiments, the provider dispatch control system 106 determines (or identifies) one or more geographical areas. The provider dispatch control system 106 can determine transportation request demand, one or more online mode slots, changes in the demand (or other factors), and monitor provider devices in each of these geographical areas. Moreover, the provider dispatch control system 106 can also identify rejected provider devices, determine surplus provider device slots, and transmit digital invitations to join an online mode to provider devices that correspond to the surplus provider device slots within each of these geographical areas.

Furthermore, a geographical area can include a (defined) zone within a region (e.g., a region in which the provider dispatch control system 106 operates and/or fulfills transportation requests). For instance, the geographical area can include sub-regions of a region that are separated by a zone and/or boundary (e.g., a boundary line of various shapes, a radius, a tessellation). In some embodiments, a geographical area can refer to a geohash (including any level of geohash like a geohash5, a geohash6, etc.) or any combination of multiple geohashes (e.g., a neighborhood or region comprising multiple geohashes).

Moreover, the provider dispatch control system 106 can determine a transportation request demand (or other factor such as a desired provider device supply) within a geographical area using various combinations of historical and/or real-time data from provider devices and/or requestor devices in the geographical area. For instance, the provider dispatch control system 106 can monitor provider device activity within a geographical area to determine idle (or wait) times of provider devices (i.e., P1 times), pickup (or travel times) of provider devices (i.e., P2 times), utilization times of provider devices (i.e., P3 times when a passenger is in a vehicle), and/or other data of the provider devices. In some embodiments, the provider dispatch control system 106 identifies such data from historical data associated with the geographical area. Indeed, the provider dispatch control system 106 can determine transportation request demand (or other factors) within the geographical area using various combinations of such data (from real time and/or historical data).

For example, the provider dispatch control system 106 can determine (or identify) a P1 time (or idle time) for a provider device as an amount of time the provider device is waiting for a transportation request (e.g., not assigned a transportation request). In particular, the P1 time can include an amount of time in which the provider device is idle and not fulfilling (or traveling to fulfill) a transportation request (e.g., a provider device idle time). The provider dispatch control system 106 can identify a P1 time that corresponds to various numbers of provider devices in a geographical area (in real time and/or from historical data).

Furthermore, the provider dispatch control system 106 can determine (or identify) a P2 time (or pickup travel time) for a provider device as an amount of time the provider device experiences travelling to a pickup location corresponding to a transportation request (e.g., a provider device pickup travel time). More specifically, the provider dispatch control system 106 can determine that a provider device is in a P2 state when the provider device is assigned a transportation request, while the vehicle corresponding to the provider device travels to a pickup location for the transportation request, and until the provider device begins to actively fulfill the transportation request (e.g., the requestor is in the vehicle corresponding to the provider device) and determine an amount of time the provider device was within this P2 state as the P2 time. Additionally, the provider dispatch control system 106 can identify a P2 time that corresponds to various numbers of provider devices in a geographical area (in real time and/or from historical data).

In addition, the provider dispatch control system 106 can determine (or identify) a P3 time (or utilization time) for a provider device as an amount of time the provider device is actively fulfilling a transportation request. For instance, the provider dispatch control system 106 can determine that a provider device is in a P3 state when the provider device (via a vehicle associated with the provider device) is actively providing transportation to a requestor to a destination location (of a transportation request) and can determine an amount of time the provider device within this P3 state as the P3 time. Indeed, the P3 time can include a utilization time of a provider device. The provider dispatch control system 106 can also identify a P3 time that corresponds to various numbers of provider devices in a geographical area (in real time and/or from historical data).

In some embodiments, the provider dispatch control system 106 utilizes historical and/or real-time requestor device data and/or transportation request data to determine transportation request demand. For example, the provider dispatch control system 106 can determine a number of requestor devices within the geographical area. The provider dispatch control system 106 can also determine a number of transportation requests within the geographical area (e.g., currently and/or historically). Furthermore, the provider dispatch control system 106 can determine lapses (or cancellations) in transportation requests within the geographical area. For instance, the provider dispatch control system 106 can determine a number of transportation requests that were not fulfilled and/or matched with a provider device (i.e., lapsed) or cancelled due to wait times (or estimated times of arrival) in the geographical area. Indeed, the provider dispatch control system 106 can utilize various combinations of the number of requestor devices, the number of transportation requests, and/or the lapses (or cancellations) in transportation requests within the geographical area to determine a transportation request demand (or other factors) within the geographical area.

The provider dispatch control system 106 can also utilize other historical and/or real-time data such as time, day, and contextual information for the geographical area to determine a transportation request demand (or other factors) within the geographical area. For example, the provider dispatch control system 106 can identify and utilize a time of day or the date to determine a transportation request demand. In addition, the provider dispatch control system 106 can identify and utilize contextual information such as, but not limited to, event information (e.g., sporting events, concerts, conventions) within the geographical area and/or weather within the geographical area to determine the transportation request demand.

In some embodiments, the provider dispatch control system 106 can also utilize historical and/or real-time data from neighboring geographical areas to determine a transportation request demand within the geographical area. For example, the provider dispatch control system 106 can utilize data such as a number of incoming provider devices from neighboring geographical areas (e.g., provider devices fulfilling a transportation request having a destination location within the geographical area), online provider devices in the neighboring geographical area, and/or a determined number of surplus provider device slots in the neighboring geographical area to determine the transportation request demand within the geographical area. Additionally, the provider dispatch control system 106 can also identify and utilize various combinations of data from provider devices, requestor devices, and/or contextual data from the neighboring geographical areas to determine the transportation request demand within the geographical area.

Indeed, in one or more embodiments, the provider dispatch control system 106 utilizes a computer-implemented prediction model to forecast transportation request demand within the geographical area. For instance, the provider dispatch control system 106 can utilize various combinations of data from provider devices (e.g., P1, P2, P3 times), data from requestor devices (e.g., a number of requestor devices in an area, a number of transportation requests), and/or other contextual data as input for a prediction model. More specifically, the provider dispatch control system 106 can utilize a prediction model to analyze the data from provider devices, data from requestor devices, and/or other contextual data to obtain a forecasted transportation request demand (or other factors such as a desired provider device supply) for a geographical area.

In some embodiments, the provider dispatch control system 106 utilizes a machine learning model (e.g., a neural network) as a prediction model to determine a number of provider device slots. In particular, the provider dispatch control system 106 utilizes ground truth data that includes a number of slots together with historical data from provider devices (e.g., P1, P2, P3 times), data from requestor devices (e.g., a number of requestor devices in an area, a number of transportation requests), and/or other contextual data to train a prediction model for a geographical area. Then, the provider dispatch control system 106 can input data from provider devices, data from requestor devices, and other contextual data into the machine learning model to generate a number of provider devices (or online mode slots).

In addition, the provider dispatch control system 106 can determine a desired number of provider devices (or online mode slots) for a geographical area based on the determined transportation request demand (or other factors such as a desired transportation provider supply) within the geographical area. For instance, the provider dispatch control system 106 can determine an increased number of provider devices for the geographical area (e.g., an increased number of online mode slots) as the determined transportation request demand becomes higher. Likewise, the provider dispatch control system 106 can determine a decreased number of provider devices for the geographical area (e.g., a decreased number of online mode slots) as the determined transportation request demand becomes lower.

Furthermore, the provider dispatch control system 106 can determine a number of provider devices for the geographical area that minimizes costs, efficiently utilizes provider devices to fulfill the transportation requests, and/or accurately adhere to limits on efficiency corresponding to regulations within the geographical area. In some embodiments, the provider dispatch control system 106 utilizes P1, P2, and/or P3 times to determine the number of provider devices to introduce in the geographical area (e.g., a number of online mode slots). For instance, the provider dispatch control system 106 can determine a desired number of provider devices that would optimally serve the transportation request demand based P1, P2, and/or P3 times corresponding to the geographical area. For example, the provider dispatch control system 106 can simulate an effect of having various numbers of provider devices in an online mode within the geographical area on P1, P2, and/or P3 times. Indeed, the provider dispatch control system 106 can determine a number of provider devices to utilize within the geographical area that sufficiently serves the determined transportation request demand while also minimizing certain provider device times (e.g., a P1 time and/or a P2 time), maximizing provider device utilization values (e.g., a P3 time), and/or most efficiently adhering to P1, P2, and/or P3 time limits (or regulations) of a geographical area.

As an example, in one or more embodiments, the provider dispatch control system 106 determines a number of provider devices to utilize within the geographical area that results in net positive P1, P2, P3 time (from the provider devices). In particular, the provider dispatch control system 106 can (via simulation, prediction models, historical data) determine a number of provider devices to utilize within the geographical area that results in a net positive P1, P2, P3 time in which the amount of P3 time exceeds costs associated with P1 and P2 times. Indeed, the provider dispatch control system 106 can determine a number of provider devices for the geographical area that results in the net positive P1, P2, P3 time while also sufficiently serving the transportation request demand within the geographical area.

Indeed, the provider dispatch control system 106 can determine a number of online mode slots for the geographical area. As mentioned above, the number of online mode slots can reflect a determined number of provider devices desired to serve the transportation request demand in the geographical area (e.g., a desired provider device supply). Then, the provider dispatch control system 106 can select provider devices for these online mode slots to assign (or place) the selected provider devices in an online mode to fulfill transportation requests within the geographical area.

Furthermore, the provider dispatch control system 106 can receive requests from provider devices to join an online mode within the geographical area. Moreover, the provider dispatch control system 106 can utilize the received requests to assign (or place) provider devices to an online mode slot from a determined number of online mode slots. For example, the provider dispatch control system 106 can select provider devices from the provider device requests to fill the online mode slots (e.g., until the number of online mode slots is reached).

In one or more embodiments, the provider dispatch control system 106 can determine a transportation request demand (or a desired provider device supply) for a geographical area, determine a corresponding number of provider devices (or online mode slots) for the geographical area, and/or reduce the number of online mode slots as described in U.S. application Ser. No. 16/672,234, filed Nov. 1, 2019, entitled DYNAMICALLY ADJUSTING TRANSPORTATION PROVIDER POOL SIZE, the contents of which are herein incorporated by reference in their entirety.

In addition, the provider dispatch control system 106 can utilize various approaches to select the provider devices for the online mode slots. For instance, the provider dispatch control system 106 can rank requesting provider devices using performance metrics (or other factors) corresponding to the provider devices (as described below) and select the provider devices to fill the online mode slots using the ranked provider devices. For example, the provider dispatch control system 106 can utilize performance metrics (or other factors) such as, but not limited to, ratings, utilization times (P3 times), idle times (P1 times), driver seniority, and/or total drive times (P2 and/or P3 times) that correspond to the provider devices. In some embodiments, the provider dispatch control system 106 selects provider devices for the online mode slots by using a first come, first serve approach. In particular, the provider dispatch control system 106 can fill online mode slots with provider devices as provider device requests are received (e.g., in chronological order).

For instance, as used herein, the term "performance metric" refers to one or more attributes, features, or actions corresponding to a provider device. In particular, the term "performance metric" can include one or more attributes corresponding to a provider device utilized to rank or select the provider device for a surplus provider device slot and/or a transportation request. For example, a performance metric can include attributes such as, but not limited to efficiency, rating, utilization time (e.g., an average or accumulated time), idle time, compliance, seniority, value, or drive time associated with a provider device (or account corresponding to a provider/provider device). In one or more embodiments, the provider dispatch control system 106 can utilize various provider device performance metrics described in U.S. patent application Ser. No. 16/909,456, filed Jun. 23, 2020, entitled GENERATING AND UTILIZING PROVIDER TIERS FOR DYNAMICALLY SURFACING PROVIDER DEVICE TRANSPORTATION TIME BLOCK INTERFACES, the contents of which are herein incorporated by reference in their entirety.

Indeed, the provider dispatch control system 106 can identify a set of provider devices that are rejected. For instance, as illustrated in FIG. 3, the provider dispatch control system 106 can reject one or more provider device requests to join an online mode. For example, the provider dispatch control system 106 can reject provider device requests from provider devices that were not selected for the online mode slots. In particular, the provider dispatch control system 106 can reject provider device requests and/or identify provider devices that correspond to the rejected requests within a set of rejected provider devices (e.g., a set of provider devices that are rejected). In addition, the provider dispatch control system 106 can determine (or log) a time of request (e.g., the time the provider device request was made) and/or a rejection time (e.g., the time the provider device request was rejected) for a rejected provider device.

The provider dispatch control system 106 can also include rejected provider devices from neighboring geographical areas as part of a set of rejected provider devices in the geographical area. For example, the provider dispatch control system 106 can, for each neighboring geographical area, receive requests to join an online mode and reject one or more of the requests. Then, the provider dispatch control system 106 can identify rejected provider devices from these neighboring geographical areas as part of rejected provider devices of the current geographical area (e.g., to increase the pool of rejected provider devices available as candidates for the online mode invitations).

As mentioned above, the provider dispatch control system 106 can identify a number of surplus provider device slots for an online mode within a geographical area. More specifically, the provider dispatch control system 106 can determine changes in transportation request demand (or other factors such as a desired provider device supply) within a geographical area. Then, the provider dispatch control system 106 can utilize the determined change in transportation request demand to determine surplus provider device slots for the geographical area (e.g., to introduce additional provider devices in the geographical area as a response to the change in transportation request demand).

Figure 4:
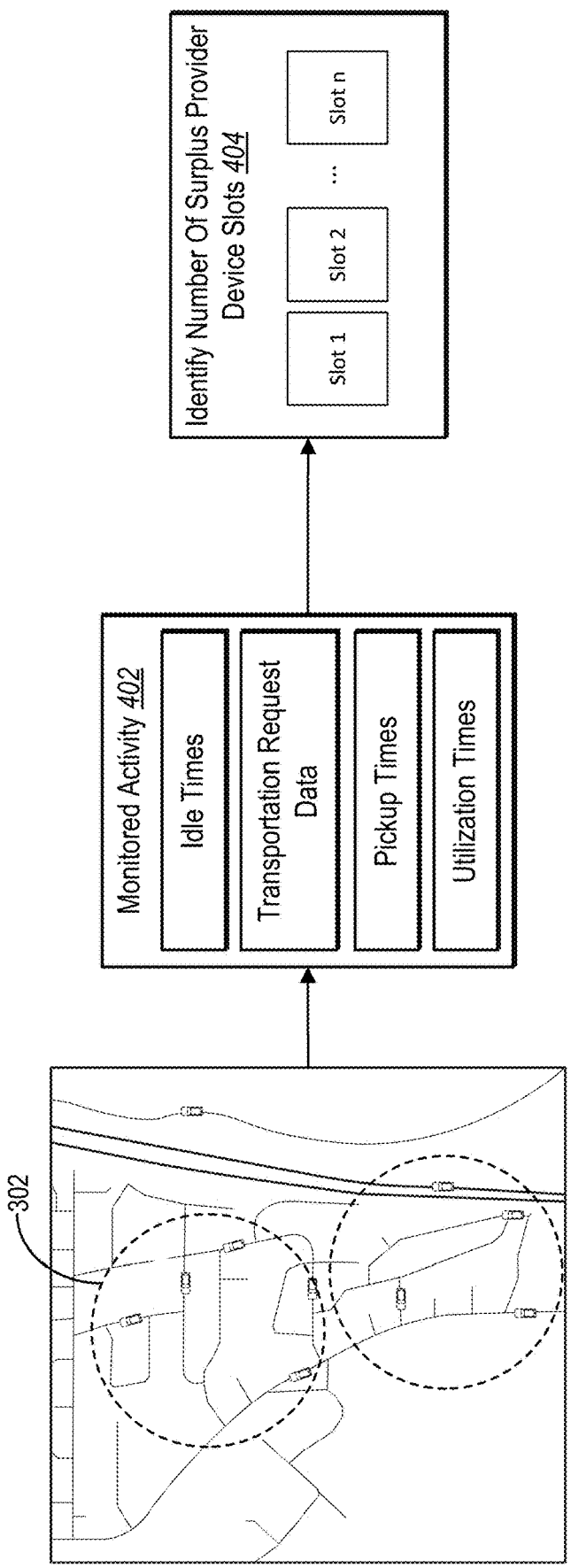
FIG. 4 illustrates a diagram of the provider dispatch control system identifying a number of surplus provider device slots in accordance with one or more embodiments.

For example, FIG. 4 illustrates the provider dispatch control system 106 identifying a number of surplus provider device slots upon determining a change in transportation request demand from monitored activity in a geographical region. In particular, subsequent to assigning one or more provider devices to an online mode and/or rejecting one or more provider device requests within the geographical area 302, the provider dispatch control system 106 monitors activity within the geographical area 302 to obtain monitored activity 402 (e.g., via provider devices and requestor devices). Indeed, as shown in FIG. 4, the provider dispatch control system 106 can monitor activity such as provider device idle times (e.g., P1 time), provider device pickup travel times (e.g., P2 time), and provider device utilization times (e.g., P3 time) corresponding to the geographical area 302. In addition, the provider dispatch control system 106 can monitor transportation request data from the geographical area 302. For example, the provider dispatch control system 106 can monitor transportation request data such as, but not limited to, a quantity of transportation requests within the geographical area 302, types of transportation requests (e.g., vehicle type, service type), estimated times of arrivals (ETAs) associated with the transportation requests, and transportation request cancellations.

As further shown in FIG. 4, the provider dispatch control system 106 can utilize the monitored activity 402 to identify a number of provider device surplus slots in an act 404. For instance, the provider dispatch control system 106 can utilize the monitored activity 402 in order to determine changes in transportation request demand (or other factor) within the geographical area (e.g., in accordance with one or more embodiments herein). Then, the provider dispatch control system 106 identifies a number of surplus provider device slots (in the act 404) to address the determined changes within the geographical area.

For instance, the provider dispatch control system 106 can monitor activity within a geographical area in real time and/or in intervals of time. For instance, the provider dispatch control system 106 can monitor (or collect) data corresponding to provider devices and/or requestor devices operating in a geographical area. The monitoring of data can be obtained from the provider devices and/or requestor devices in real time by having the provider dispatch control system 106 obtain the data as the devices determine and/or generate the data. In some embodiments, the provider dispatch control system 106 requests (and/or receives) data from the provider and/or requestor devices at various intervals of times (e.g., 5-minute intervals, 10-minute intervals, hour intervals). Moreover, in one or more embodiments, the provider dispatch control system 106 utilizes monitored activity from historical data (e.g., historical data from provider devices and/or requestor devices operating within the geographical area).

For example, as described above, the provider dispatch control system 106 can monitor idle times (e.g., P1 times) for one or more provider devices (e.g., as a total P1 time and/or average P1 time across one or various combinations of provider devices operating within the geographical area). Furthermore, as described above, the provider dispatch control system 106 can also monitor pickup travel times (e.g., P2 times) and/or utilization times (e.g., P3 times) for one or more provider devices. For instance, the provider dispatch control system 106 can monitor activity of provider devices to determine a total P2 or P3 time or an average P2 or P3 time across one or various combinations of provider devices operating within the geographical area.

In addition, as described above, the provider dispatch control system 106 can also monitor activity of provider devices and/or requestor devices to determine transportation request data. For instance, the provider dispatch control system 106 can collect (or monitor) transportation request data such as a total number of transportation requests, an average number of transportation requests, and/or an average estimated time of arrival associated with transportation requests from transportation requests occurring within the geographical area. Furthermore, as described above, the provider dispatch control system 106 can also monitor activity to obtain time, day, and/or contextual information (e.g., weather and/or events) within the geographical area.

Upon monitoring activity to obtain a variety of data from provider devices and/or requestor devices within the geographical area, the provider dispatch control system 106 can analyze the monitored activity to determine changes in transportation request demand (or other factors such as a desired provider device supply). For example, the provider dispatch control system 106 can determine a transportation request demand in accordance with one or more embodiments (described above). Moreover, the provider dispatch control system 106 can determine a transportation request demand at an initial time (to determine a number of online mode slots) and subsequently determine a transportation request demand at a future time (e.g., a current time). Then, the provider dispatch control system 106 can compare the transportation request demand at the initial time with the transportation request demand at the future time to determine a change in transportation request demand. Indeed, the provider dispatch control system 106 can utilize one or more approaches described above to determine changes in transportation request demand (or other factors) in real time and/or at time intervals.

Although one or more embodiments herein describe determining a transportation request demand and/or a change in the transportation request demand, the provider dispatch control system 106 can determine changes in various factors corresponding to a geographical location. For instance, the provider dispatch control system 106 can determine a desired provider device supply within a geographical area reflecting the number of provider devices to efficiently service transportation requests in a geographical area (e.g., servicing the transportation requests while achieving a desired provider device utilization metric). For example, the provider dispatch control system 106 can determine a number of provider devices desired to efficiently service transportation requests in a geographical area while achieving a desired P1 and/or P2 time in the geographical area. Furthermore, the provider dispatch control system 106 can also determine changes in factors such as a number of transportation requests (e.g., as an average or total) and/or the number of requestor devices (e.g., as an average or total) within the geographical area.

In one or more embodiments, the provider dispatch control system 106 determines a number of surplus provider device slots based on the determined change in transportation request demand (or another factor). For instance, the provider dispatch control system 106 can utilize the change in transportation request demand (or new transportation request demand) to determine a desired number of provider devices for the geographical area in accordance with one or more embodiments herein. In particular, as described above, the provider dispatch control system 106 can determine an increase in a number of desired online mode slots as the change in transportation request demand indicates an increased transportation request demand (and vice versa). Moreover, the provider dispatch control system 106 can utilize the increase in the number of desired online mode slots as the number of surplus provider device slots.

Furthermore, in one or more embodiments, the provider dispatch control system 106 determines a target utilization time (P3 time), idle time (P1 time), and/or pickup travel time (P2 time) for a change in transportation requests (or a determined state of undersupply). Then, the provider dispatch control system 106 can determine a number of surplus provider device slots to reach the target utilization time (P3 time), idle time (P1 time), and/or pickup travel time (P2 time). For example, in some embodiments, the provider dispatch control system 106 can utilize the determined state of undersupply (or change in transportation requests from requestor devices) to identify a positive change (an increase) in an online mode slot limit within a geographical area that will achieve a target utilization time (P3 time), idle time (P1 time), and/or pickup travel time (P2 time). The provider dispatch control system 106 can utilize the identified positive change to determine a number of surplus provider device slots. In one or more embodiments, a geographical area can have strict limits on provider device efficiency and the provider dispatch control system 106 determines target utilization time (P3 time), idle time (P1 time), and/or pickup travel time (P2 time) for the limits on the provider device efficiency in the geographical area.

In some embodiments, the provider dispatch control system 106 utilizes a prediction model with the monitored activity to determine a number of surplus provider device slots that will achieve a target or maximize a utilization times (P3 times) of provider devices and/or achieve a target or minimize another time based metrics (e.g., P1 and/or P2 times) within the geographical area. For instance, the provider dispatch control system 106 can utilize a prediction model that analyzes historical data to model the effects of varying online mode slots in a geographical area. Indeed, the provider dispatch control system 106 can utilize the prediction model to identify a predicted change in utilization times (P3 times), idle times (P1 times), and/or pickup travel times (P2 times) resulting from introducing a surplus provider device slot. Then, the provider dispatch control system 106 can utilize an optimization function (e.g., a linear optimization function) to determine a number of surplus provider device slots that will maximize utilization times (P3 times)

and/or minimize idle times and/or pickup travel times (P1 and P2 times) within the geographical area (while addressing the transportation request demand in the geographical area). In some embodiments, the provider dispatch control system 106 determines a number of surplus provider device slots that achieves a target utilization time (P3 times), idle time (P1 time), and/or pickup travel time (P2 time) within the geographical area. For example, the digital slot selection system 106 can determine a number of provider device slots to achieve a target P1, P2, and/or P3 time as described in U.S. application Ser. No. 16/672,234, filed Nov. 1, 2019, entitled DYNAMICALLY ADJUSTING TRANSPORTATION PROVIDER POOL SIZE, the contents of which are herein incorporated by reference in their entirety.

As mentioned above, the provider dispatch control system 106 can select a subset of provider devices to fill surplus provider device slots in response to a change in transportation request demand by leveraging previously rejected provider devices. Indeed, the provider dispatch control system 106 can select, from a set of provider devices that were rejected, the subset of provider devices (for the surplus provider device slots) in order to invite the subset of provider devices to join an online mode within the geographical area. In one or more embodiments, the provider dispatch control system 106 selects the subset of provider devices by selecting provider devices that correspond to rejected requests to be in an online mode in the geographical area within a threshold rejection time span (prior to a time instance of identifying the number of surplus slots).

Figure 5A:
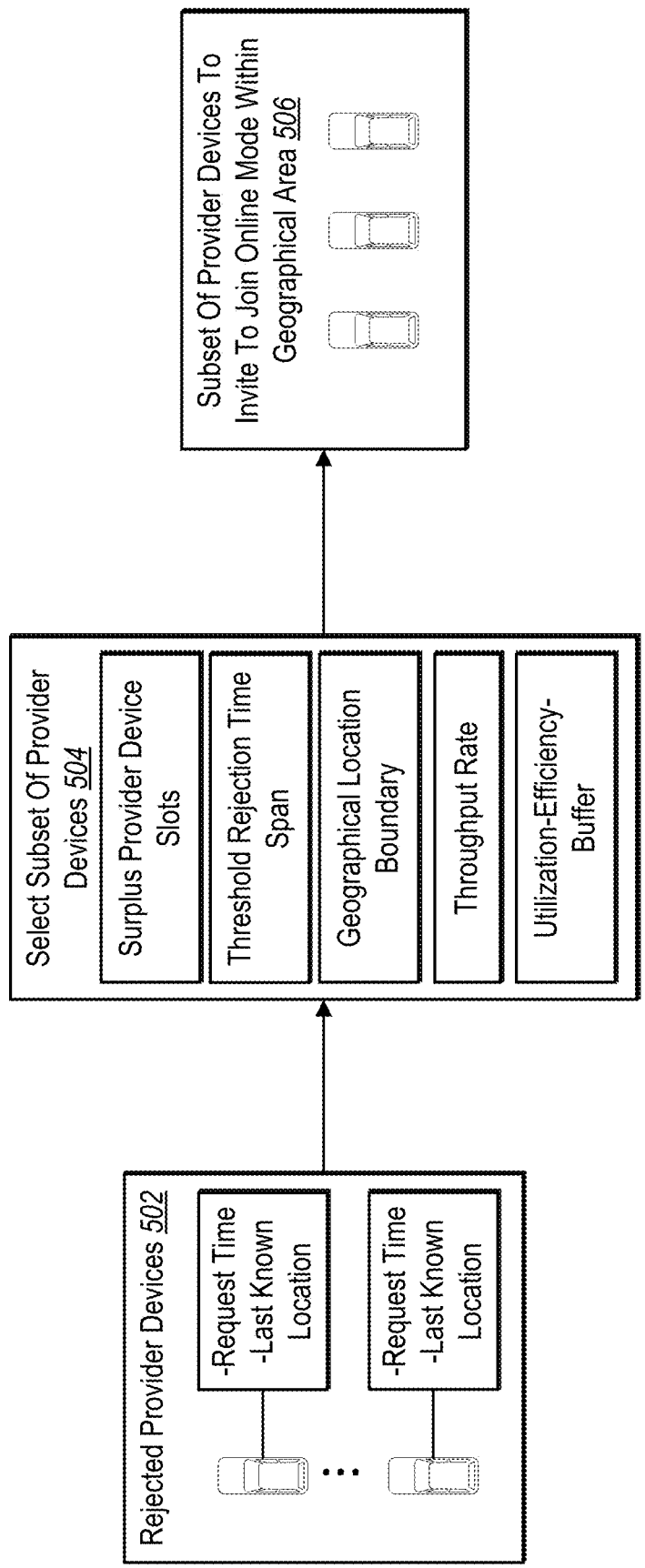
FIGS. 5A-5B illustrate diagrams of the provider dispatch control system selecting provider devices to invite to join an online mode in accordance with one or more embodiments.
Figure 6A:
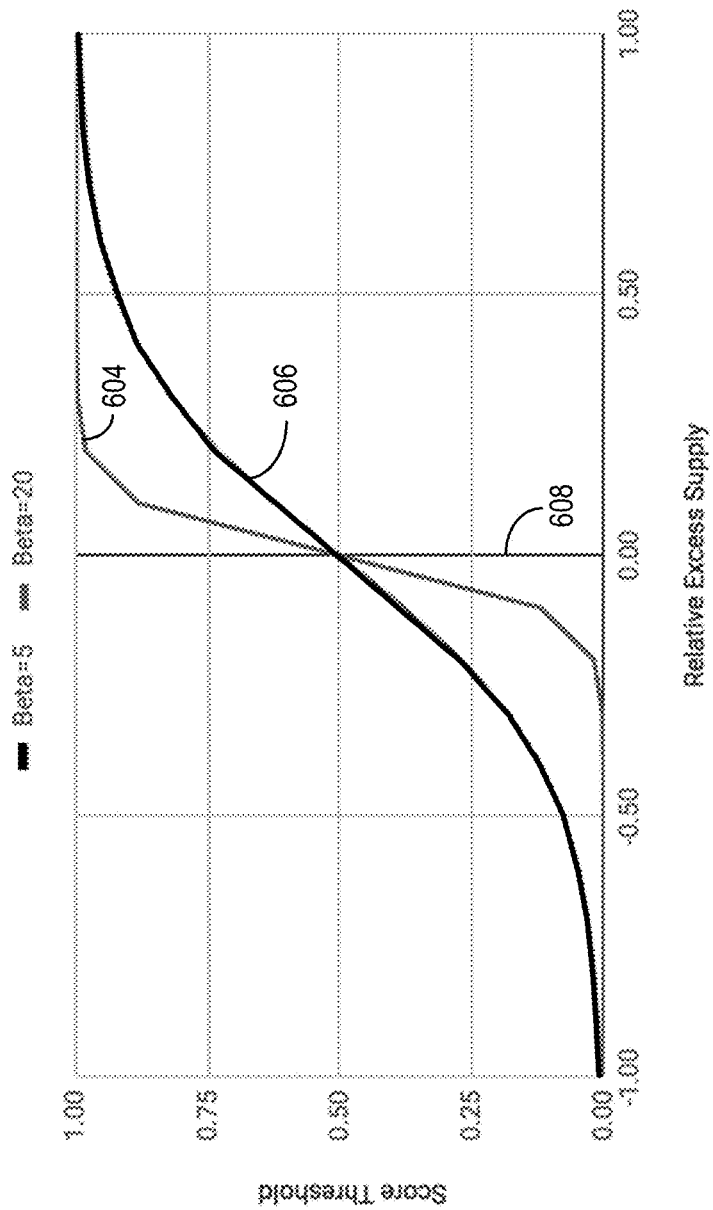
FIGS. 6A-6C illustrate diagrams of the provider dispatch control system utilizing a score threshold-surplus slot model in accordance with one or more embodiments.

For instance, FIG. 5A illustrates the provider dispatch control system 106 leveraging previously rejected provider devices to select a subset of provider devices to fill a number of provider device surplus slots (e.g., to respond to an identified change in transportation request demand). As shown in FIG. 5A, the provider dispatch control system 106 identifies a set of rejected provider devices 502. In addition, as illustrated in FIG. 5A, the provider dispatch control system 106 also identifies, for each of the rejected provider devices in the set of rejected provider devices 502, a request time (e.g., when the provider device requested to go online) and a last known location. Furthermore, as shown in FIG. 5A, the provider dispatch control system 106 selects a subset of provider devices in an act 504 to identify (or determine) a subset of provider devices to invite to join an online mode within a geographical area 506. Indeed, as illustrated in FIG. 5A, the provider dispatch control system 106 can utilize various combinations of surplus provider device slots, a threshold rejection time span, a geographical location boundary, a throughput rate, and a utilization-efficiency-buffer (with the request times and/or last known locations) to select the subset of provider devices in the act 504.

For instance, in order to select a subset of provider devices to invite to an online mode, the provider dispatch control system 106 can utilize a threshold rejection time span. In one or more embodiments, the provider dispatch control system 106 determines a time of rejection for a provider device (from the set of rejected provider devices). Then, the provider dispatch control system 106 can compare the time of rejection with a threshold rejection time span (prior to a time instance corresponding to the identification of a number of surplus provider device slots). Indeed, the provider dispatch control system 106 can select the rejected provider device for the subset of provider devices when the time of rejection (corresponding to the rejected provider device) meets the threshold rejection time span (e.g., the time of rejection is equal to or less than the threshold rejection time span). By doing so, the provider dispatch control system 106 can leverage rejected provider devices that have been more recently rejected to join the online mode within the geographical area.

As an example, in some embodiments, the provider dispatch control system 106 can utilize a threshold rejection time span of fifteen minutes. The provider dispatch control system 106 can determine whether a rejected provider device was rejected within the threshold rejection time span (e.g., within the last 15 minutes). If so, the provider dispatch control system 106 can select the rejected provider device for the subset of provider devices to invite. Otherwise, the provider dispatch control system 106 can forego selecting the particular rejected provider device for the subset of provider devices.

Additionally, in order to select a subset of provider devices to invite to an online mode, the provider dispatch control system 106 can utilize a geographical location boundary. For instance, the provider dispatch control system 106 can also utilize a last known location of a rejected provider device with a geographical location boundary to select the rejected provider device for the subset of provider devices. For example, the provider dispatch control system 106 can identify (or determine) the last known location for the rejected provider device. Subsequently, the provider dispatch control system 106 can compare the last known location with a geographical location boundary of the geographical area to determine whether the last known location is within the boundary. Indeed, the provider dispatch control system 106 can utilize a last received GPS transmission from the rejected provider device or a drop off location from the last known transportation service request fulfilled by the rejected provider device.

More specifically, the provider dispatch control system 106 can select the rejected provider device for the subset of provider devices when the last known location is within the geographical area (e.g., within the geographical location boundary). Otherwise, the provider dispatch control system 106 can forgo the rejected provider device for the subset of provider devices to invite to an online mode. In some embodiments, the provider dispatch control system 106 can also select a rejected provider device for the subset of provider devices when the provider device's last known location is within neighboring geographical area (e.g., a wider geographical location boundary that includes multiple geographical areas).

Furthermore, in order to select a subset of provider devices to invite to an online mode, the provider dispatch control system 106 can also utilize a threshold notification time span. For instance, the provider dispatch control system 106 can identify (or determine) whether a digital invitation was transmitted to a rejected provider device within a threshold notification time span. Indeed, upon determining that a digital invitation was transmitted (or provided) to the rejected provider device within the threshold notification time span, the provider dispatch control system 106 can forgo selecting the rejected provider device for the subset of provider devices to invite to join an online mode. For example, the threshold notification time span can include time spans such as, but not limited to, a 24-hour time span, a one-hour time span, or a 15-minute time span. Subsequently, in some embodiments, the provider dispatch control system 106 foregoes selection of a rejected provider device that has received a digital invitation within the threshold notification time span to avoid the transmission of overlapping digital invitations.

In addition, the provider dispatch control system 106 can also identify whether a rejected provider device is within an online mode (e.g., online mode status) in another geographical area. For example, the provider dispatch control system 106 can forgo selecting the rejected provider device for the subset of provider devices when the rejected provider device is within an online mode in another geographical area (or accepted an invitation to be in an online mode in another geographical area). Moreover, the provider dispatch control system 106 can determine that the rejected provider device is (actively) fulfilling a transportation request that places the rejected provider device outside of the geographical area (or geographical location boundary). In such a case, the provider dispatch control system 106 can also forego selecting the rejected provider device for the subset of provider devices.

Moreover, the provider dispatch control system 106 can utilize various combinations of the above-mentioned approaches (e.g., rejection time, last known location, online mode status, notification transmission times) to select (or not select) rejected provider devices for a subset of provider devices to invite to an online mode. Indeed, the provider dispatch control system 106 can determine whether a combination of the above thresholds are met prior to selecting a rejected provider device for the subset of provider devices. For example, the provider dispatch control system 106 can determine, for a rejected provider device, if both the time of rejection meets a threshold rejection time span and the last known location is within a geographical location boundary prior to selecting the rejected provider device for the subset of provider devices.

In one or more embodiments, prior to selecting a subset of provider devices to invite to an online mode within the geographical area, the provider dispatch control system 106 determines whether the number of surplus provider device slots satisfies a surplus slot threshold. Indeed, by doing so, the provider dispatch control system 106 can create a buffer to reduce reactions to minor and/or insignificant changes in transportation request demand. For example, the provider dispatch control system 106 can utilize a surplus slot threshold obtained from an administrator device (e.g., a computing device operated by an administrator of the provider dispatch control system 106). As an example, the provider dispatch control system 106 can select provider devices to invite to an online mode (to fill the surplus provider device slots) when the determined number of surplus provider device slots meets or exceeds the surplus slot threshold. Moreover, the provider dispatch control system 106 can prevent the selection of additional provider devices to invite to an online mode within the geographical area when the determined number of surplus provider device slots do not meet the surplus slot threshold.

In some embodiments, the provider dispatch control system 106 can utilize a detected-change-duration guardrail to reduce reactions to momentary and/or false changes in transportation request demand within a geographical area. For instance, the provider dispatch control system 106 can determine changes in transportation requests from requestor devices (or other factors) over a time span (e.g., a detected-change-duration guardrail) to determine that the change in transportation requests from requestor devices (or the state of provider device under supply) is consistent and/or enduring within the geographical area (i.e., not momentary and/or false). As an example, the provider dispatch control system 106 can determine changes in transportation request demand across time span (e.g., 5-minutes, 10-minutes) to determine whether the change in transportation requests from requestor demands (e.g., a determination of a positive surplus slot limit) is present across the time span. Indeed, the provider dispatch control system 106 can determine a number of surplus provider device slots and/or prior to selecting a subset of provider devices to invite (and inviting) to join an online mode when a change in transportation request demand is present across such a time span (i.e., a detected-change-duration guardrail). As an example, to utilize the detected-change-duration guardrail, the provider dispatch control system 106 can determine changes in transportation requests from requestor devices at different times (e.g., every 5-minutes) to establish that the changes are not momentary prior to selecting a subset of provider devices to invite to join an online mode.

Furthermore, the provider dispatch control system 106 can determine a number of provider devices to select for the subset of provider devices (to invite to an online mode). In one or more embodiments, the provider dispatch control system 106 selects a number of provider devices to match the number of surplus provider device slots. For instance, the provider dispatch control system 106 can select the subset of provider devices to fill the number of surplus provider device slots. For example, the provider dispatch control system 106 can select provider devices from a set of rejected provider devices to fill an identified number of surplus provider device slots within a geographical area (e.g., to completely and/or partially fill the number of surplus provider device slots).

In one or more embodiments, the provider dispatch control system 106 determines a number of provider devices to invite to an online mode that is greater than the number of surplus provider device slots. For instance, the provider dispatch control system 106 can invite a greater number of rejected provider devices (in relation to the number of identified surplus provider device slots) to increase the likelihood that a sufficient number of provider devices will join the online mode within the geographical area (e.g., some digital invitations may not elicit a response). Indeed, the provider dispatch control system 106 can select provider devices from a set of rejected provider devices using the above-mentioned approaches to satisfy a number of provider devices to invite to join an online mode.

In some embodiments, the provider dispatch control system 106 determines a number of provider devices to invite to the online mode by utilizing a throughput rate. Indeed, the provider dispatch control system 106 can utilize a throughput rate that corresponds to (or reflects) a probability of a provider device interacting with a digital invitation to join the online mode. In particular, the throughput rate can represent a probability value that indicates the likelihood of a provider device (or provider) interacting with a digital invitation and joining an online mode (after receiving the digital invitation). Indeed, the provider dispatch control system 106 can utilize a throughput rate to increase the likelihood of the identified surplus number of provider device slots being filled with provider devices in an online mode. More specifically, in some embodiments, the provider dispatch control system 106 utilizes a throughput rate to increase the number of provider devices that are invited to be greater than the number of surplus provider device slots. For example, the provider dispatch control system 106 can determine a number of provider devices to invite to an online mode (n) by using a combination of the number of surplus provider device slots and a throughput rate (as a probability value) using the following equation:

$$n = \text{Slot Limit} \times \frac{1}{\text{Throughput Rate}}.$$

In one or more embodiments, the provider dispatch control system 106 can determine a throughput rate using historical data within the geographical area. For instance, the provider dispatch control system 106 can determine a throughput rate by analyzing a response rate to historical digital invitations to join an online mode (e.g., to determine a rate of digital invitations that resulted in an acceptance from provider devices). In particular, the provider dispatch control system 106 can utilize historical responses to historical digital invitations within a geographical area to determine the likelihood of a provider device (or provider) interacting with a digital invitation and joining an online mode (after receiving the digital invitation) (i.e., a throughput rate).

In addition, the provider dispatch control system 106 can use a utilization-efficiency-buffer value to discount the determined number of provider devices to select for an invitation to join an online mode. In some embodiments, the provider dispatch control system 106 uses the utilization-efficiency-buffer to increase the likelihood that a provider device is highly utilized upon receiving a digital invitation to join the online mode. In particular, the provider dispatch control system 106 can utilize the utilization-efficiency-buffer value to limit and/or control the likelihood of oversupplying a geographical area such that provider devices experience a substantial decrease in utilization and/or efficiency (e.g., high P1/P2 times and/or low P3 times).

For example, the provider dispatch control system 106 can discount the number of provider devices to select (n) by using a utilization-efficiency-buffer value ($\alpha$) in the following equation:

$$n = \left(\text{Slot Limit} \times \frac{1}{\text{Throughput Rate}}\right) \times (1 - \alpha).$$

For instance, the provider dispatch control system 106 can utilize a utilization-efficiency-buffer value ($\alpha$) of 0.1 to discount the number of provider devices to select by ten percent.

Furthermore, the provider dispatch control system 106 can determine a utilization-efficiency-buffer value using historical data within the geographical area. For example, the provider dispatch control system 106 can analyze historical metrics resulting from transmitting invitations to fill a number of surplus provider device slots within a geographical area to determine a utilization-efficiency-buffer value. In particular, the provider dispatch control system 106 can analyze historical metrics such as idle times (P1), pickup travel times (P2), and/or utilization times (P3) that have resulted from transmitting invitations to fill a number of surplus provider device slots (in the past) and/or based on a number of surplus provider devices going online within a geographical area to determine a utilization-efficiency-buffer value. For example, the provider dispatch control system 106 can increase (or decrease) the utilization-efficiency-buffer value based on changes in the observed historical idle times (P1), pickup travel times (P2), and/or utilization times (P3) due to an introduction of a number of surplus provider devices.

Furthermore, the provider dispatch control system 106 can adjust (or modify) a number of provider devices to invite to join an online mode. For example, the provider dispatch control system 106 can, at a subsequent interval of time, redetermine a number of surplus provider devices slots based on a determined change in transportation request demand at the subsequent interval of time. Indeed, the provider dispatch control system 106 can reselect a subset of provider devices to invite based on the redetermined number of surplus provider device slots.

In addition, the provider dispatch control system 106 can determine an adjusted number of provider devices to invite to the online mode using a modified throughput rate. For instance, the provider dispatch control system 106 can modify (or adjust) the throughput rate. In particular, the provider dispatch control system 106 monitor user interactions such as responses (e.g., the number of joins, the number of declines, the number of non-responses) to digital invitations from a historical and/or previous digital invitations. Furthermore, the provider dispatch control system 106 can utilize the user interactions (with the digital invitations) to determine a response rate. Then, the provider dispatch control system 106 can adjust the throughput rate based on this response rate. For example, if the response rate determined from user interactions is low, the provider dispatch control system 106 can raise the throughput rate to increase the number of provider devices to invite to join the online mode. Likewise, if the response rate determined from the user interactions is high, the provider dispatch control system 106 can decrease the throughput rate to reduce the number of provider devices to invite. By doing so, the provider dispatch control system 106 can control or reduce the likelihood of oversupplying a geographical area.

In some embodiments, the provider dispatch control system 106 utilizes rejected provider devices from other geographical areas (e.g., neighboring geographical areas) to respond to a change in transportation request demand within a geographical area. For example, the provider dispatch control system 106 can identify rejected provider devices in neighboring geographical areas. Then, the provider dispatch control system 106 can select from these rejected provider devices in addition to rejected provider devices in the current geographical area to select a subset of provider devices to invite to an online mode in accordance with one or more embodiments herein.

Furthermore, in one or more embodiments, the provider dispatch control system 106 selects between rejected provider devices to satisfy a determined number of provider devices to select to join an online mode. For example, FIG. 5B illustrates the provider dispatch control system 106 selecting between rejected provider devices for the subset of provider devices to invite to join an online mode within a geographical location (while satisfying a number of provider devices to invite).

Figure 5B:
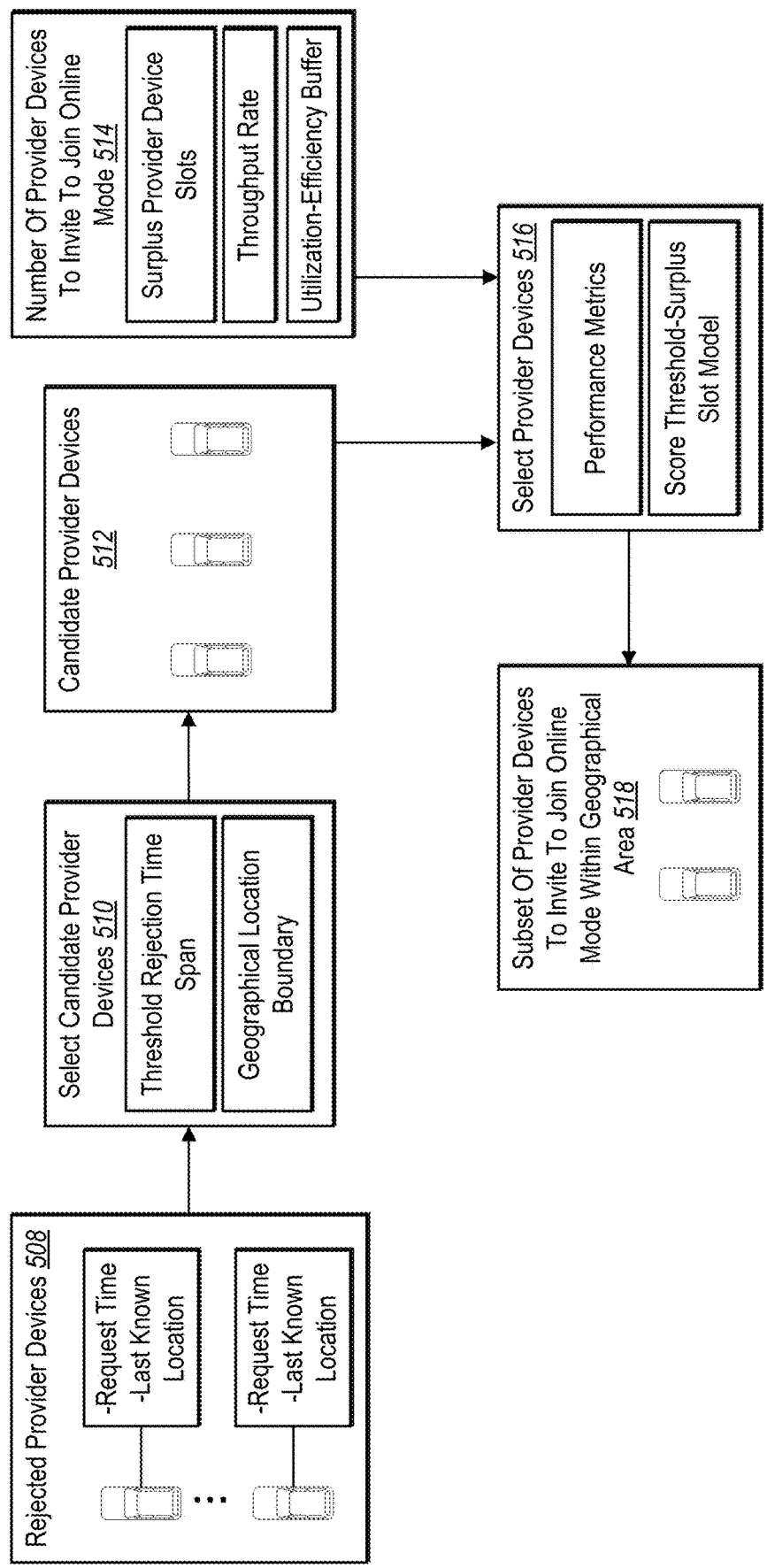

As shown in FIG. 5B, the provider dispatch control system 106 can select candidate provider devices 512 in an act 510 from a set of rejected provider devices 508. For instance, as shown in FIG. 5B, the provider dispatch control system 106 selects the candidate provider devices 512 in the act 510 utilizing a threshold rejection time span and/or a geographical location boundary. Indeed, the provider dispatch control system 106 can utilize a time of request and/or a last known location of a rejected provider device with the threshold rejection time span and/or the geographical location boundary to select the candidate provider devices 512 in accordance with one or more embodiments herein. For example, the provider dispatch control system 106 can utilize one or more of the approaches described above (e.g., using rejection time, last known location, online mode status, other notifications) to select one or more provider devices from the rejected provider devices as candidate provider devices to invite to join an online mode within a geographical area.

In addition, as shown in FIG. 5B, the provider dispatch control system 106 can determine a number of provider devices to invite to join an online mode 514 (within a geographical area). In particular, as illustrated in FIG. 5B, the provider dispatch control system 106 can utilize a determined number of surplus provider device slots, a throughput rate, and/or a utilization-efficiency-buffer to determine the number of provider devices to invite to join an online mode 514. For instance, the provider dispatch control system 106 can determine a number of provider devices to invite to join the online mode 514 by utilizing an identified number of surplus provider device slots, a throughput rate, and/or a utilization-efficiency-buffer as described above.

Moreover, as illustrated in FIG. 5B, the provider dispatch control system 106 utilizes the candidate provider devices 512 and the number of provider devices to invite to join the online mode 514 to select provider devices in an act 516 for the subset of provider devices to invite to join the online mode within the geographical area 518. For instance, as shown in FIG. 5B, the provider dispatch control system 106 utilizes performance metrics (corresponding to the candidate provider devices 512) and/or a score threshold-surplus slot model to select provider devices in the act 516 for the subset of provider devices to invite to join the online mode within the geographical area 518. Indeed, the provider dispatch control system 106 can select provider devices (in act 516) to satisfy the number of provider devices to invite to join the online mode 514.

In some embodiments, the provider dispatch control system 106 selects each candidate provider device when the number of candidate provider devices are equal to or less than the determined number of provider devices to invite to join an online mode. Additionally, when the number of identified candidate provider devices is more than the determined number of provider devices to invite to join an online mode, the provider dispatch control system 106 can utilize performance metrics and/or the score threshold-surplus slot model to select the subset of provider devices from the candidate provider devices.

For example, the provider dispatch control system 106 can utilize performance metrics to select from candidate provider devices to satisfy the number of provider devices to invite to the online mode. In particular, the provider dispatch control system 106 can monitor activity (or obtain monitored activity) of the candidate provider devices to identify performance metrics corresponding to these provider devices. Then, the provider dispatch control system 106 can analyze the one or more performance metrics that correspond to the candidate provider devices to select the subset of provider devices from the candidate provider devices.

In one or more embodiments, the provider dispatch control system 106 identifies a rating associated with a candidate provider device (e.g., a driver rating). For instance, the provider dispatch control system 106 can identify and analyze a driver rating that is created by the dynamic transportation matching system 104. Furthermore, the provider dispatch control system 106 can base a driver rating on various other factors of the provider device such as, but not limited to, earnings, passenger reviews/feedback, drive time, efficiency, and/or other factors described below.

Additionally, the provider dispatch control system 106 can also identify and analyze a utilization time corresponding to a candidate provider device (e.g., driver utilization time). In some embodiments, the provider dispatch control system 106 identifies and analyzes a utilization time (e.g., a P3 time). For example, the provider dispatch control system 106 can identify an average utilization time that is associated with a candidate provider device (e.g., across a set of transportation requests fulfilled by the provider device). In some embodiments, the provider dispatch control system 106 also identifies and analyzes a total drive time. For instance, the provider dispatch control system 106 can determine an accumulated amount of time associated with the candidate provider device actively fulfilling transportation requests (e.g., a total amount of time in a P3 state). In some embodiments, the provider dispatch control system 106 can determine a total earnings from the candidate provider device based on the utilization time and/or total driver time.

Furthermore, the provider dispatch control system 106 can identify and analyze a driver idle time corresponding to a candidate provider device. More specifically, the provider dispatch control system 106 can identify and analyze an amount of time the provider device is within an idle state (e.g., P1 time). Indeed, the provider dispatch control system 106 can identify and analyze a total driver idle time or an average driver idle time (e.g., the average P1 time between transportation requests).

Moreover, the provider dispatch control system 106 can identify and analyze driver seniority associated with a candidate provider device. In particular, the provider dispatch control system 106 can identify and analyze the amount of time a provider device has been actively using a dynamic transportation matching application of the dynamic transportation matching system 104. For example, the driver seniority can include an amount of time (or age) in which the candidate provider device has been fulfilling transportation requests using the dynamic transportation matching application of the dynamic transportation matching system 104.

Furthermore, the provider dispatch control system 106 can analyze one or more of the above-mentioned performance metrics to rank candidate provider devices in order to select the subset of provider devices from the candidate provider devices. In particular, the provider dispatch control system 106 can determine weights and scores associated with the one or more performance metrics to rank a candidate provider device respective to other candidate provider devices. For instance, the provider dispatch control system 106 can determine a greater weight for driver rating and driver utilization time and provide a higher rank to candidate provider devices corresponding to higher driver ratings and driver utilization times. Indeed, the provider dispatch control system 106 can utilize performance metrics associated with the candidate provider devices to generate a ranked list of candidate provider devices. Then, the provider dispatch control system 106 can select the subset of provider devices from the candidate provider devices by selecting from the ranked list of candidate provider devices (e.g., beginning from a top ranked provider device) to satisfy the determined number of provider devices to invite to join an online mode.

In some embodiments, the provider dispatch control system 106 can utilize one or more thresholds associated with the candidate provider device performance metrics to select the subset of provider devices from the candidate provider devices. For instance, the provider dispatch control system 106 can analyze performance metrics associated with a candidate provider device to identify whether they meet thresholds for those performance metrics. Then, the provider dispatch control system 106 can select the candidate provider device for the subset of provider devices if the performance metrics do meet the thresholds for the performance metrics. For example, the provider dispatch control system 106 can compare a driver utilization time of a candidate provider device to a threshold driver utilization time. Moreover, the provider dispatch control system 106 can select the candidate provider device if the provider device's driver utilization time meets a threshold driver utilization time. The provider dispatch control system 106 can select a candidate provider device upon identifying whether various combinations of the performance metrics meet thresholds for those performance metrics.

In addition, the provider dispatch control system 106 can utilize various combinations of performance metrics to select the subset of provider devices from the candidate provider devices. For instance, the provider dispatch control system 106 can utilize each or various subsets of the performance metrics described in one or more embodiments herein. Moreover, the provider dispatch control system 106 can also utilize various other performance metrics associated with the provider devices to select the subset of provider devices from the candidate provider devices.

In one or more embodiments, the provider dispatch control system 106 utilizes machine learning to analyze performance metrics for selection of the subset of provider devices from the candidate provider devices. More specifically, the provider dispatch control system 106 can utilize a machine learning model (e.g., a neural network based model) to select candidate provider devices that are more likely to join the online mode (or improve/achieve an efficiency in terms of utilization and/or other metric) by analyzing performance metrics of the candidate provider device with historical data in the geographical area. Indeed, the provider dispatch control system 106 can utilize a variety of machine learning models to analyze performance metrics for selection of the subset of provider devices from the candidate provider devices.

In some embodiments, the provider dispatch control system 106 can select the subset of provider devices from the candidate provider devices by using times of request (or rejection times) corresponding to the candidate provider devices. For instance, the provider dispatch control system 106 can select the subset of provider devices from the candidate provider devices beginning from the newest rejection time to the oldest rejection time. Indeed, the provider dispatch control system 106 can rank the candidate provider devices based on an order of when the candidate provider devices were rejected (or requested to join an online mode) and use the ranked candidate provider devices to select the subset of provider devices (to satisfy a determined number of provider devices to invite to join an online mode).

As just mentioned, the provider dispatch control system 106 can also utilize a score threshold-surplus slot model to select a subset of provider devices from candidate provider devices to invite to join an online mode. For instance, the provider dispatch control system 106 can utilize the score threshold-surplus slot model to select a subset of provider devices while satisfying a determined number of provider devices to invite to join the online mode. Indeed, in some embodiments, the provider dispatch control system 106 generates a score threshold-surplus slot model reflecting a mapping of a number of provider devices to invite (or surplus provider device slots) and a threshold selection score of being selected for the online mode in a geographic area. Then, the provider dispatch control system 106 can select a subset of provider devices from candidate provider devices to invite to join an online mode by comparing selection scores of the candidate provider devices to an output threshold selection score from the score threshold-surplus slot model using the determined number of surplus provider device slots or a number of provider devices to invite.

For example, as used herein, the term "score threshold-surplus slot model" refers to a model that utilizes a dynamic value corresponding to a provider device being allowed online within a geographical area (in the dynamic transportation matching system 104). In particular, a score threshold-surplus slot model can include a model that determines a probability (between zero and one) of allowing a provider device in a geographical area to go online as a function of surplus provider device slots (e.g., excess provider devices in the geographical area). For instance, the provider dispatch control system 106 can utilize the score threshold-surplus slot model to generate a threshold selection score (e.g., a dynamic probabilistic value) and utilize the threshold selection score to select a subset of provider devices from candidate provider devices to invite to join an online mode. Indeed, the provider dispatch control system 106 can utilize the threshold selection score as a limiter (percentile) that is compared to selection scores of provider devices to determine whether to select the provider devices into the subset of provider devices to invite to an online mode.

As an example, upon using the score threshold-surplus slot model to generate a threshold selection score of 0.3, the provider dispatch control system 106 can select a subset of provider devices from candidate provider devices that are above the $30^{th}$ percentile of the candidate provider devices. For instance, the provider dispatch control system 106 can utilize performance metrics associated with the candidate provider devices to rank (as described above) and determine a selection score (e.g., a percentile) for the candidate provider devices. Indeed, the provider dispatch control system 106 can determine a higher selection score (e.g., a higher percentile) to a provider device that is ranked as a better selection based on performance metrics. Indeed, the provider dispatch control system 106 can utilize performance metrics to rank and assign a selection score to a provider device. Moreover, when the threshold selection score is 0.3, the provider dispatch control system 106 can select between the candidate provider devices that are above a selection score of 0.3 (e.g., above the $30^{th}$ percentile) using the performance metrics (or other approaches) described above for the subset of provider devices to invite to an online mode.

As just mentioned, the provider dispatch control system 106 can utilize the determined number of surplus provider device slots or a number of provider devices to invite to determine a threshold selection score within the score threshold-surplus slot model. For instance, the provider dispatch control system 106 can utilize the determined number of surplus provider device slots or a number of provider devices to invite to determine a relative excess supply (of provider devices). For example, the provider dispatch control system 106 can utilize a number of provider devices in an online mode within a geographical area (S(t)) and a target number of provider devices to have online (S*(t)) (i.e., the online mode provider devices and the number of provider devices to invite). For example, the provider dispatch control system 106 can determine S*(t) as S(t)+y (where y is a determined number of surplus provider device slots or a number of provider devices to invite in accordance with one or more embodiments herein). Then, the provider dispatch control system 106 can determine a relative excess supply (RES) using the following equation:

$$RES(t) = \frac{S(t) - S*(t)}{S*(t)}.$$

Furthermore, the provider dispatch control system 106 can utilize the relative excess supply to generate a score threshold-surplus slot model (as a sigmoid function). In particular, the provider dispatch control system 106 can utilize the relative excess supply to determine a threshold selection score, z, using the following equation:

$$z = \frac{1}{1 + e^{\beta RES(t)}}.$$

Indeed, the provider dispatch control system 106 can utilize β (β>0) to represent a parameter that controls the sensitivity of the threshold selection score z to the relative excess supply RES(t). The provider dispatch control system 106 can utilize the relation between the threshold selection score z to the relative excess supply RES(t) to generate a score threshold-surplus slot model that outputs a threshold selection score based on an input determined number of surplus provider device slots or a number of provider devices to invite.

As an example, as S(t) becomes much larger than the target supply level S*(t), the threshold selection score approaches one (i.e., a lower chance of being allowed online or a selection of a provider device that is above the $100^{th}$ percentile based on having a selection score of one when the threshold selection score is one). If S(t) is much less than the target supply level S*(t), then the threshold selection score approaches zero (i.e., a higher chance of being allowed online or a selection of a provider device that is above the $0^{th}$ percentile based on having a selection score of 0 or greater when the threshold score is zero). If the sensitivity parameter β is very large, then the threshold selection score approaches a step function from zero to one when transitioning from under-to one-supply of provider devices within a geographical area. Accordingly, and as shown for example in FIG. 6A, the provider dispatch control system 106 can use lower values of β to achieve a softer transition for a limiter (percentile) that decides which provider devices are selected into the subset of provider devices to invite to an online mode based on the number of surplus provider device slots and/or a number of online mode provider devices.

For example, the provider dispatch control system 106 can utilize the score threshold-surplus slot model in determining whether a selection score (based on performance metrics) of a candidate provider device for the subset of provider devices satisfies a threshold selection score corresponding to the number of surplus provider device slots. FIG. 6 illustrates a threshold-surplus slot model as a graph of threshold selection score (score threshold) as a function of a relative number of excess transportation providers in accordance with one or more embodiments. As shown in FIG. 6, the graph illustrates the threshold selection score as a function of relative excess supply level of provider devices for two different values of the sensitivity parameter (beta), which control the transition of threshold selection score lines 604, 606 around a target level 608 of relative excess supply of provider devices (determined as described above).

In particular, the provider dispatch control system 106 can generate the threshold selection score line 604 and the threshold selection score line 606 using beta values as described above. In this specific example illustration, the threshold selection score line 604 represents threshold selection scores as a function of relative excess supply of transportation providers according to a sensitivity parameter (beta) of five. Similarly, in this example illustration, the threshold selection score line 606 represents threshold selection scores as a function of relative excess supply of transportation providers according to a higher/larger sensitivity parameter (beta) of twenty. In these or other embodiments, as the sensitivity parameter (beta) approaches infinity, the threshold selection score line approaches a binary function based upon which the provider dispatch control system 106 decreases the difficulty of being selected for the subset of provider devices (e.g., a lower percentile requirement due to a lower threshold selection score) when the relative excess supply is decreasing (e.g., under-supplied in the geographical area) and increasingly makes it difficult for provider devices to be selected for the subset of provider devices when the relative excess supply increases (e.g., over-supplied in the geographical area). On the other hand, the provider dispatch control system 106 may use lower values of the sensitivity parameter (beta) to achieve a smoother transition around the target level 608 of relative excess supply of transportation providers (RES).

In more detail, for example with respect to the threshold selection score line 604, the threshold selection score is approximately (i) zero when the relative excess supply (RES) is −1.0, (ii) 0.1 when the RES is −0.50, (iii) 0.5 when the RES is 0 (i.e., at the target level 608), (iv) 0.85 when the RES is 0.5, and (v) 1.0 when the RES is 1.0. Similarly, for example with respect to the threshold selection score line 606, the threshold selection score is approximately (i) zero when the RES is −1.0, (ii) zero when the RES is −0.5, (iii) 0.5 when the RES is 0 (i.e., at the target level 608), (iv) 1.0 when the RES is 0.5, and (v) 1.0 when the RES is 1.0. Thus, as the RES increases from left to right beginning at negative one (e.g., the gap between a target supply level and current supply level of provider devices decreases), the threshold selection score also increases, which means that, in some embodiments, the provider dispatch control system 106 selects provider devices for the subset of provider devices to invite with increasing strictness (e.g., a higher percentile requirement for the provider devices). For example, the provider dispatch control system 106 can require a candidate provider device to have an increasingly higher selection score (e.g., be in a higher percentile or selection score based on a ranking from performance metrics) to satisfy the threshold selection score as the RES increases for selecting into the subset of provider devices to invite to the online mode.

Figure 6B:
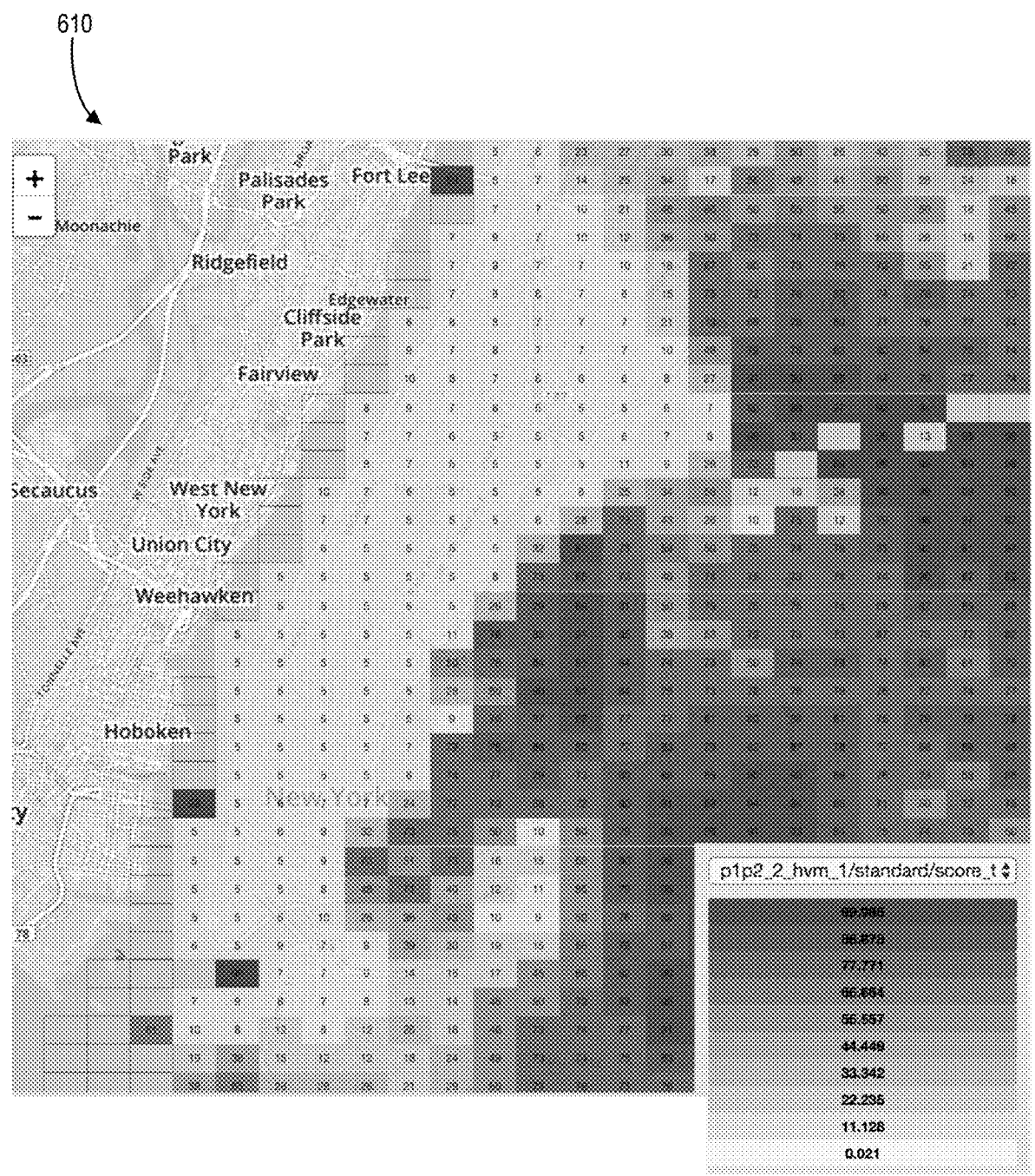
Figure 6C:
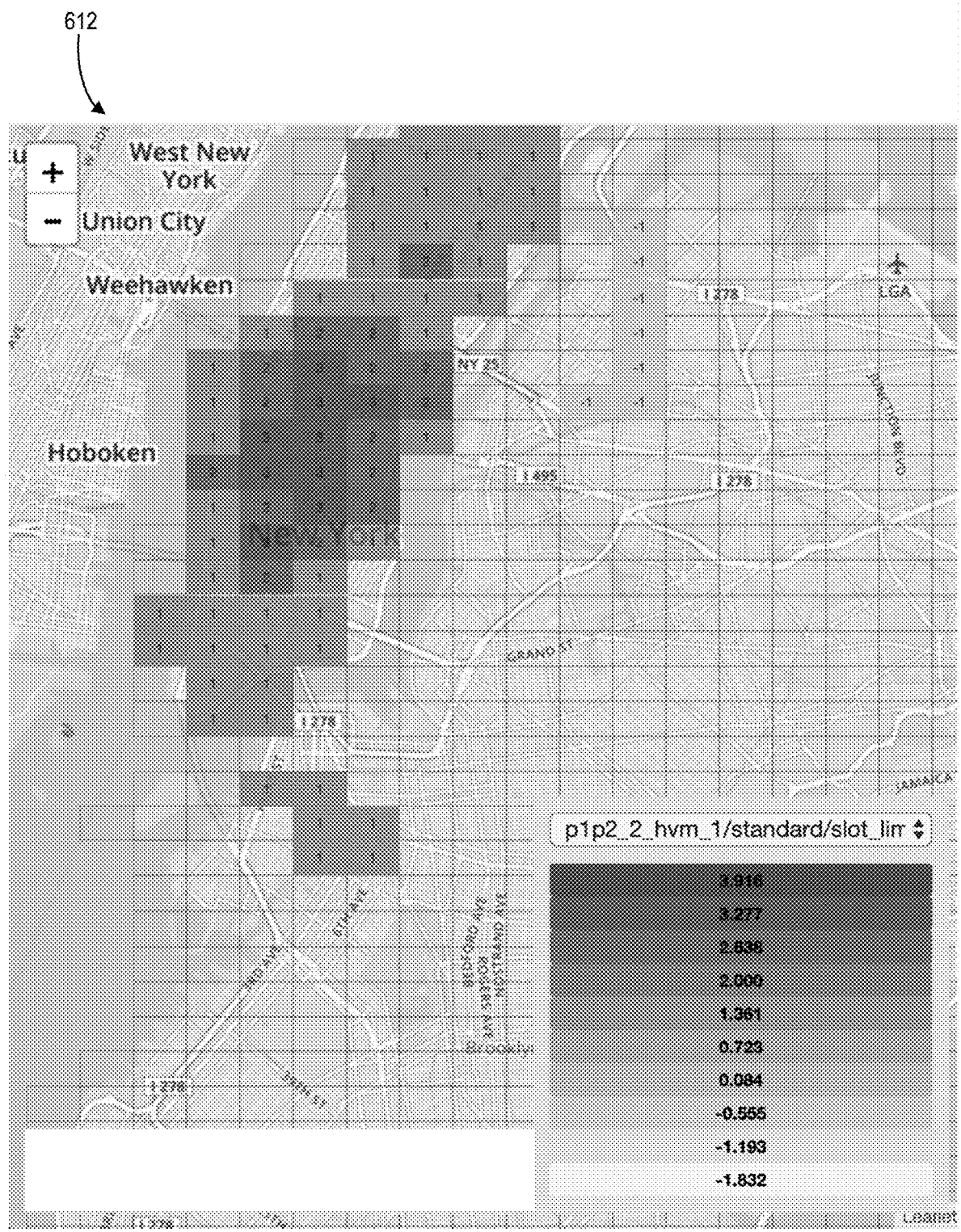

Furthermore, the provider dispatch control system 106 can determine threshold selection scores and/or relative excess supply values for a variety of geographical areas to generate score threshold-surplus slot models for the geographical areas. Indeed, the provider dispatch control system 106 can determine threshold selection scores for a variety of geographical areas in accordance with one or more embodiments herein. As an example, FIG. 6B illustrates the provider dispatch control system 106 determining separate threshold selection scores for a variety of geographical areas in a map diagram 610. Furthermore, the provider dispatch control system 106 can determine relative excess supply values for a variety of geographical areas in accordance with one or more embodiments herein. Indeed, FIG. 6C illustrates the provider dispatch control system 106 determining relative excess supply values (e.g., as slot limits) for a variety of geographical areas in a map diagram 612.

As mentioned above, the provider dispatch control system 106 can transmit digital invitations to join an online mode to a selected subset of provider devices (from rejected provider devices in a geographical area). For instance, upon selecting a subset of provider devices to invite to an online mode in accordance with one or more embodiments herein, the provider dispatch control system 106 can transmit digital invitations to join an online mode in a geographical area. For example, FIG. 7, illustrates the provider dispatch control system 106 transmitting digital invitations to such a subset of provider devices.

Figure 7:
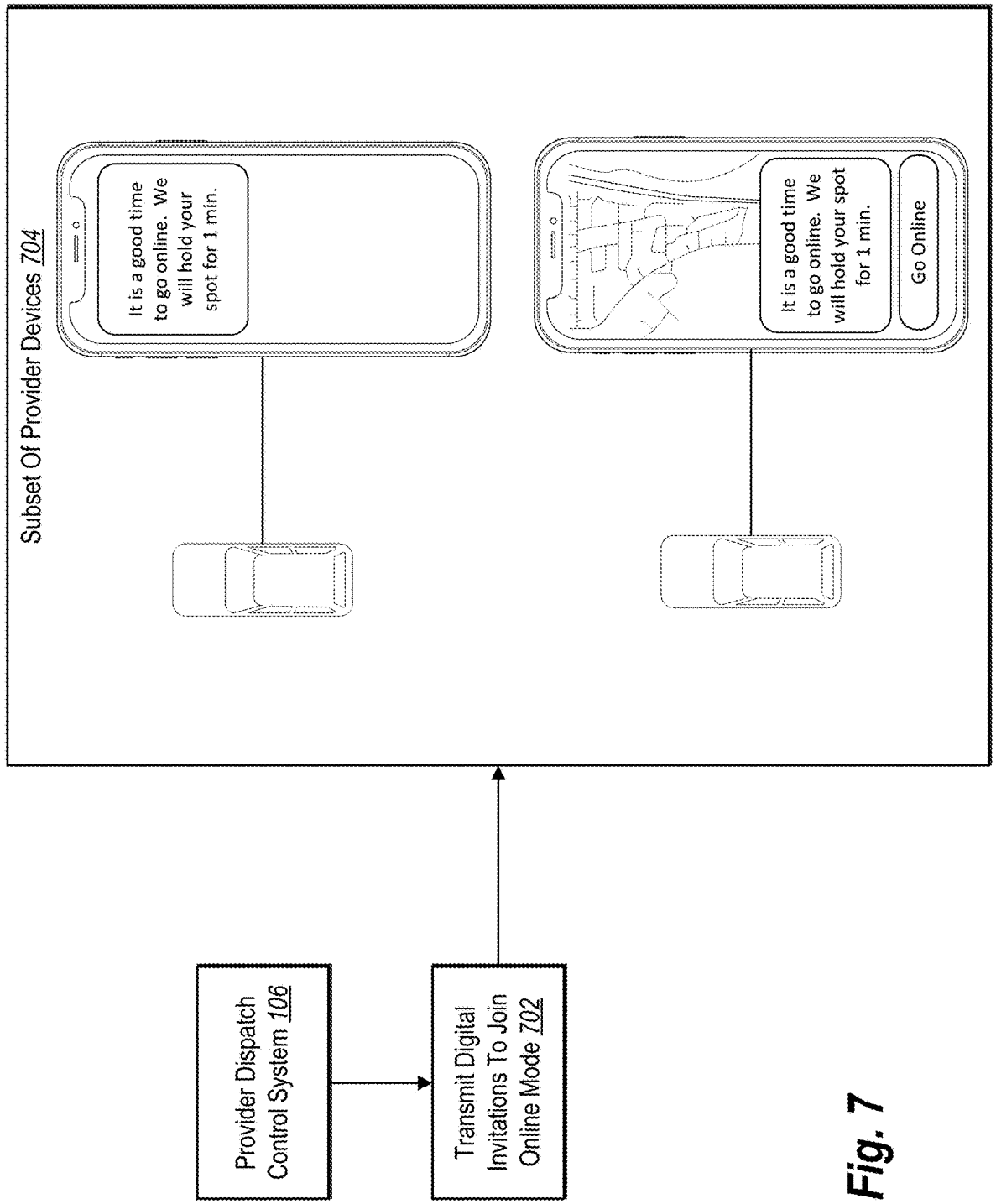
FIG. 7 illustrates a diagram of the provider dispatch control system transmitting a digital invitation to join an online mode in accordance with one or more embodiments.

As shown in FIG. 7, upon selecting a subset of provider devices to invite to join an online mode in a geographical area, the provider dispatch control system 106 transmits digital invitations to join the online mode in an act 702. Indeed, as illustrated in FIG. 7, the subset of provider device 704 can receive digital invitations that are displayed in various graphical user interfaces. For example, as shown in FIG. 7, the provider dispatch control system 106 can provide a digital invitation for display as a push notification and/or in a banner within a dynamic transportation matching application. The provider dispatch control system 106 can also receive (or detect) user interactions with the push notification and/or the banner having the digital invitation to switch the provider device into an online mode (from an offline mode) within the geographical area (e.g., to service transportation requests within the geographical area).

In one or more embodiments, the provider dispatch control system 106 provides a digital invitation for display within a (push) notification on a graphical user interface of a provider device. Indeed, the provider dispatch control system 106 can provide the digital invitation for display within a graphical user interface for notifications that is separate from the dynamic transportation matching application (e.g., an operating system push notification, an operating system notification menu). Additionally, the provider dispatch control system 106 can provide the digital invitation within a notification that includes a selectable option (e.g., a graphical element or button) to directly accept the digital invitation and/or to navigate to the dynamic transportation matching application to review (or accept) the online mode invitation. Furthermore, the provider dispatch control system 106 can display a reservation time (e.g., the amount of time the invitation and/or online mode slot will remain open for the receiving provider device).

Additionally, the provider dispatch control system 106 can provide a digital invitation for display within a banner, an electronic message (e.g., instant message, text message, E-mail), and/or other graphical user interface element within the dynamic transportation matching application. For example, the provider dispatch control system 106 can provide one or more selectable options (as described above) for the digital invitation within the banner. In addition, the provider dispatch control system 106 can also provide information corresponding to the geographical area and other terms for the online mode invitation (e.g., a duration, reservation time) for display within the banner. Indeed, the provider dispatch control system 106 can detect (or receive) user interactions with the one or more selectable options (to join the online mode) in the banner or graphical user interface element. In addition, the provider dispatch control system 106 can also provide, for display, a selectable option to reject the digital invitation. Upon receiving (or detecting) the user interaction to join, the provider dispatch control system 106 can switch the provider device into an online mode within the geographical area (from an offline mode).

Moreover, the provider dispatch control system 106 can reserve a surplus online mode slot for a transmitted digital invitation to join the online mode. For example, the provider dispatch control system 106 can reserve the surplus online mode slot for a threshold reservation time. Indeed, the provider dispatch control system 106 can maintain the surplus online mode slot open for a provider device that receives the transmitted digital invitation. In addition, the provider dispatch control system 106 can delay (or prevent) the transmission of additional digital invitations (e.g., additional from an initial batch of digital invitations provided to a selected subset of provider device) while the reservation time threshold has not completed. In one or more embodiments, the provider dispatch control system 106 can determine (or adjust) a threshold reservation time based on historical response rates to digital invitations and/or based on the determined transportation request demand in the geographical area (e.g., a lesser threshold reservation time for a high transportation request demand and vice versa).

In some embodiments, the provider dispatch control system 106 selects an additional provider device after the threshold reservation time lapses for transmitted digital invitation or upon receiving a rejection to the digital invitation. For instance, the provider dispatch control system 106 can identify (or select) an additional provider device (from the set of rejected provider devices) in accordance with one or more embodiments herein. Then, the provider dispatch control system 106 can transmit a digital invitation to join the online mode to the additional provider device. For example, the provider dispatch control system 106 can transmit digital invitations in waves (with a portion of the selected provider devices) to determine a number of threshold reservation time lapses or rejections prior to sending an additional wave of digital invitations. Indeed, in the additional wave of digital invitations, the provider dispatch control system 106 can replace the provider devices that did not join the online mode by selecting additional provider devices in accordance with one or more embodiments herein. In some embodiments, the provider dispatch control system 106 waits to transmit a second round of digital invitations until after an entire additional subset of provider devices are selected in accordance with one or more embodiments herein. In one or more embodiments, the provider dispatch control system 106 selects additional provider devices to invite from the rejected (or candidate) provider devices when a provider device within the subset of provider devices does not respond or rejects a digital invitation to join the online mode.

Furthermore, upon receiving an indication of a user interaction (e.g., a selection) with a selectable option corresponding to a digital invitation (e.g., via a notification) from a provider device, the provider dispatch control system 106 can switch the provider device to an online mode. In particular, the provider dispatch control system 106 can assign (or add) the provider device into a surplus online mode slot within the geographical area. Indeed, the provider dispatch control system 106 can enable the provider device to receive and/or service transportation requests in the geographical area after the provider device is added to the surplus online mode slot.

As mentioned above, the provider dispatch control system 106 can also monitor responses and/or non-responses corresponding to digital invitations to determine a response rate. In addition, the provider dispatch control system 106 can utilize the determined response rate to update (or determine) a number of provider devices to invite to join the online mode (e.g., further based on the number of surplus provider device slots). In some embodiments, the provider dispatch control system 106 monitors click through rates from the digital invitations to determine a response rate. Indeed, the provider dispatch control system 106 can determine a response rate and can update a throughput rate and/or utilization-efficiency-buffer based on the response rate (as described above).

Furthermore, the provider dispatch control system 106 can determine a response monetary value (e.g., an incentive price) for accepting a digital invitation to join an online mode. For instance, the provider dispatch control system 106 can determine the response monetary value using various combinations of the determined transportation request demand, the number of provider devices online in the geographical area, historical utilization metrics (or value gains) from introducing an additional provider device in the geographical area, a number of provider devices available to invite to an online mode, and/or performance metrics of a particular provider device. For example, the provider dispatch control system 106 can determine an increasing response monetary value as a determined transportation request demand increases and/or a number of provider devices available to invite to an online mode decreases. The provider dispatch control system 106 can further provide the response monetary value for display with the digital invitation (as an offer for joining the online mode).

In addition, the provider dispatch control system 106 can also leverage previously rejected provider device slots to respond to changes in transportation request demand in a prioritized transportation dispatch mode and/or for transportation provider shifts (in accordance with one or more embodiments herein). For instance, the provider dispatch control system 106 can identify a transportation request demand (or other factor) and subsequent change in demand within a geographical area. Furthermore, the provider dispatch control system 106 can identify a number of surplus provider device slots (for the prioritized transportation dispatch mode or for transportation provider shifts) using the change in demand. Then, the provider dispatch control system 106 can identify provider devices that were previously rejected (from joining the prioritized transportation dispatch mode or from transportation provider shifts) and select a subset of provider devices from the rejected provider devices based on a time of rejection (or another factor). Finally, the provider dispatch control system 106 can transmit a digital invitation to the selected subset of provider devices to join the prioritized transportation dispatch mode or to enter a transportation provider shift. The provider dispatch control system 106 can transmit digital invitations to a prioritized transportation dispatch mode that operates as described in DISPATCHING PROVIDER DEVICES UTILIZING MULTI-OUTCOME TRANSPORTATION-VALUE METRICS AND DYNAMIC PROVIDER DEVICE MODES, which is incorporated by reference herein in its entirety.

Moreover, the provider dispatch control system 106 can transmit digital invitations to join an online mode in response to changes in demand within a geographical area leveraging previous transportation provider device requests at time intervals (in accordance with one or more embodiments). For instance, the provider dispatch control system 106 can periodically (e.g., at a time interval) determine changes in demand and determine a number of surplus provider device. In addition, the provider dispatch control system 106 can periodically select a subset of provider devices to invite from previously rejected provider devices and transmit digital invitations to the updated subset of provider devices. For instance, the subset of provider devices can be from a reranked list of candidate provider devices and/or can include additional provider devices (that have been recently rejected) in the new time interval.

Finally, the provider dispatch control system 106 can also remove provider devices that have rejection times outside of threshold rejection time span during a periodic update. Likewise, the provider dispatch control system 106 can transmit digital invitations to join an online mode in response to changes in demand within a geographical area by leveraging previous transportation provider device requests in real time (in accordance with one or more embodiments herein).

In addition, the provider dispatch control system 106 can determine response rates, throughput rates, and/or time intervals across various points of the digital invitation transmission. For example, the provider dispatch control system 106 can determine response rates, throughput rates, and/or time intervals across points of the transmission such as when the digital invitation is sent, received, viewed, opened, accepted, and/or when the provider device services a transportation request under the online mode. Furthermore, the provider dispatch control system 106 can also utilize the various points of the digital invitation transmission to determine a time for when to determine a number of surplus provider device slots and/or for when to invite provider devices to join an online mode (for the surplus provider device slots) in accordance with one or more embodiments herein.

Moreover, the provider dispatch control system 106 can determine a utilization metric and/or earning metric for slots (or shifts) following a digital invitation to join an online mode. Indeed, the provider dispatch control system 106 can determine utilization metrics and/or earning metrics in relation to all of the provider devices in an online mode in a geographical area. In some embodiments, the provider dispatch control system 106 separately tracks utilization metrics and/or earning metrics for provider devices that are online via the digital invitations for the surplus provider device slots. Indeed, the provider dispatch control system 106 can utilize the separately tracked utilization metrics and/or earning metrics to adjust (at a subsequent time) a number of surplus provider device slots, a throughput rate, a utilization-efficiency-buffer rate, and/or threshold performance metric for selection into a surplus provider device slot.

Furthermore, the provider dispatch control system 106 can utilize a determined number of surplus provider device slots, transmissions of digital invitations, and/or response rates to the digital invitations as input into a transportation request online mode slot forecasting model (e.g., a supply control model). In particular, the provider dispatch control system 106 can provide various combinations of the determined number of surplus provider device slots, transmissions of digital invitations, and/or response rates to the digital invitations for analysis within a transportation request online mode slot forecasting model that forecasts (or determines) a transportation request demand, desired metrics (e.g., idle times, utilization times, pickup travel times), and/or a number of online mode slots to utilize in a geographical area. Indeed, the provider dispatch control system 106 can utilize a transportation request online mode slot forecasting model that accounts for one or more of a determined number of surplus provider device slots, transmissions of digital invitations, and/or response rates to the digital invitations (determined or provided in accordance with one or more embodiments herein).

Figure 8:
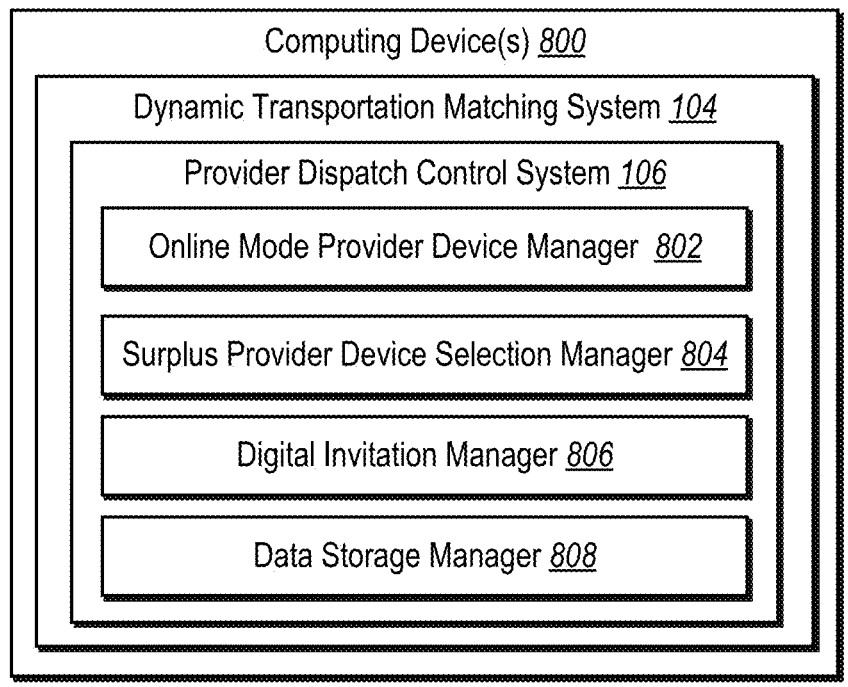
FIG. 8 illustrates a block diagram of a provider dispatch control system in accordance with one or more embodiments.

Turning now to FIG. 8, additional detail will be provided regarding components and capabilities of one embodiment of the provider dispatch control system. In particular, FIG. 8 illustrates an embodiment of an example provider dispatch control system 106 executed by a computing device 800 (e.g., the server device(s) 102). As shown by the embodiment in FIG. 8, the computing device 800 can include or host the dynamic transportation matching system 104 and the provider dispatch control system 106. The provider dispatch control system 106 can include an online mode provider device manager 802, a surplus provider device selection manager 804, a digital invitation manager 806, and a data storage manager 808.

As just mentioned and as illustrated in the embodiment in FIG. 8, the provider dispatch control system 106 can include the online mode provider device manager 802. For example, the online mode provider device manager 802 can determine a transportation request demand (or desired provider device supply) in a geographical area as described above (e.g., in relation to FIG. 3). Furthermore, the online mode provider device manager 802 can receive requests from provider devices to join an online mode and assign/reject provider devices to/for the online mode as described above (e.g., in relation to FIG. 3). Additionally, the online mode provider device manager 802 can determine a change in transportation request demand and identify a number of surplus provider device slots for an online mode within a geographical area as described above (e.g., in relation to FIG. 4).

Furthermore, as shown in FIG. 8, the provider dispatch control system 106 can include the surplus provider device selection manager 804. For instance, the surplus provider device selection manager 804 can select provider devices (from a set of rejected provider devices) to fill the surplus provider device slots to invite to join an online mode using a threshold rejection time span as described above (e.g., in relation to FIG. 5A). Furthermore, the surplus provider device selection manager 804 can also determine a number of provider devices to invite to join an online mode using combinations of the surplus provider device slots, a throughput rate, and/or a utilization-efficiency-buffer value as described above (e.g., in relation to FIGS. 5A and 5B). Furthermore, the surplus provider device selection manager 804 can select provider devices to invite to join the online mode while satisfying a determined number of provider devices to invite using various combinations of performance metrics and/or a score threshold-surplus slot model as described above (e.g., in relation to FIG. 5B). Moreover, the surplus provider device selection manager 804 can generate and utilize a score threshold-surplus slot model as described above (e.g., in relation to FIGS. 6A-6C).

Additionally, the provider dispatch control system 106 can include the digital invitation manager 806. For example, the digital invitation manager 806 can transmit digital invitations (for display as notifications) to join an online mode to provider devices selected for the surplus provider device slots as described above (e.g., in relation to FIG. 7). Furthermore, the digital invitation manager 806 can transmit digital invitations that include selectable options to join an online mode (which place a provider device in an online mode upon interaction with the selectable options) as described above (e.g., in relation to FIG. 7).

Moreover, as shown in FIG. 8, the provider dispatch control system 106 can include the data storage manager 808. The data storage manager 808 can communicate with any of the other components of the provider dispatch control system 106 to obtain and/or provide data. For instance, the data storage manager 808 can include data such as provider device information (P1, P2, P3 times), transportation request information, and/or online mode request information to determine a number of online mode slots and sets of provider devices (online and/or rejected). Furthermore, the data storage manager 808 can include data such as transportation request demand data (or provider device supply data), monitored activity of provider devices and/or requestor devices to determine a number of surplus provider device slots. Additionally, the data storage manager 808 can include data such as rejection times, provider device locations, threshold rejection time spans, geographical location boundaries, threshold reservation times, throughput rates, utilization-efficiency-buffer values, performance metrics for provider devices, and/or score threshold-surplus slot models to select provider devices for the number of surplus provider device slots and determine digital invitations to join an online mode. Moreover, the data storage manager 808 can include graphical user interface data to generate, transmit, display, and receive interactions within digital invitations (e.g., as notifications, banners, other graphical elements) as described above (e.g., in relation to FIG. 7).

In one or more embodiments, each of the components of the provider dispatch control system 106 are in communication with other components using any suitable communication technologies. Additionally, the components of the provider dispatch control system 106 can be in communication with one or more other devices including other computing devices of a user, server devices (e.g., cloud storage devices), licensing servers, or other devices/systems. It will be recognized that although the components of the provider dispatch control system 106 are shown to be separate in FIG. 8, any of the subcomponents may be combined into fewer components, such as into a single component, or divided into more components as may serve a particular implementation. Furthermore, although the components of FIG. 8 are described in connection with the provider dispatch control system 106, at least some of the components for performing operations in conjunction with the provider dispatch control system 106 described herein may be implemented on other devices within the environment.

The components of the provider dispatch control system 106 can include software, hardware, or both. For example, the components of the provider dispatch control system 106 can include one or more instructions stored on a computer-readable storage medium and executable by processors of one or more computing (or computer) devices (e.g., the computing device 800). When executed by the one or more processors, the computer-executable instructions of the provider dispatch control system 106 can cause the computing device 800 to perform the operations described herein. Alternatively, the components of the provider dispatch control system 106 can include hardware, such as a special purpose processing device to perform a certain function or group of functions. Additionally, or alternatively, the components of the provider dispatch control system 106 can include a combination of computer-executable instructions and hardware.

Furthermore, the components of the provider dispatch control system 106 performing the functions described herein with respect to the provider dispatch control system 106 may, for example, be implemented as part of a stand-alone application, as a module of an application, as a plug-in for applications, as a library function or functions that may be called by other applications, and/or as a cloud-computing model. Thus, the components of the provider dispatch control system 106 may be implemented as part of a stand-alone application on a personal computing device or a mobile device.

Figure 9:
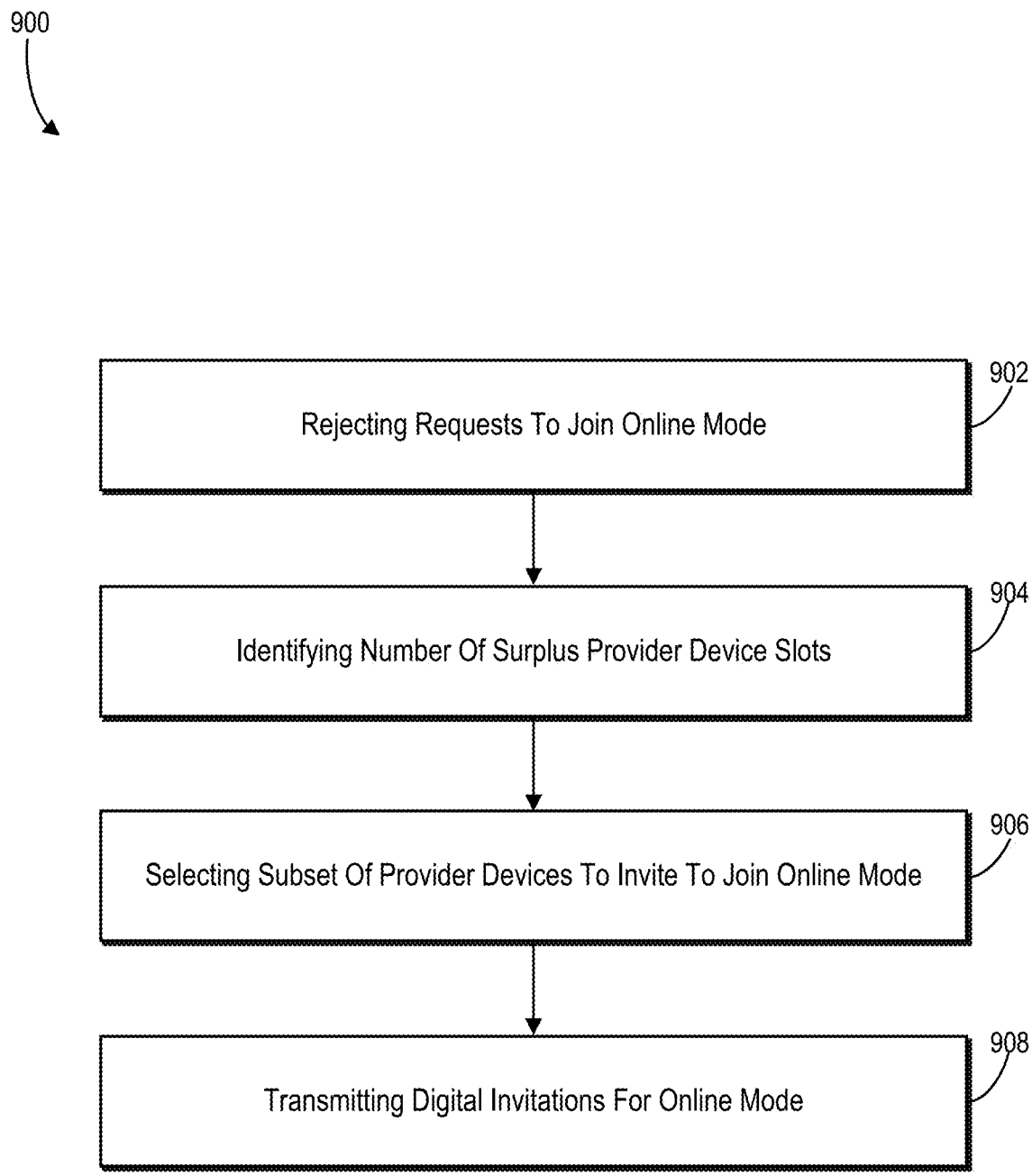
FIG. 9 illustrates a flowchart of a series of acts for transmitting digital invitations to join an online mode in response to changes in demand within a geographical area by leveraging previous transportation provider device requests in accordance with one or more embodiments.

Turning now to FIG. 9, this figure shows a flowchart of a series of acts 900 for transmitting digital invitations to join an online mode in response to changes in demand within a geographical area by leveraging previous transportation provider device requests. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable storage medium can comprise instructions that, when executed by one or more processors, cause a computing device to perform the acts depicted in FIG. 9. In still further embodiments, a system can perform the acts of FIG. 9.

As shown in FIG. 9, the series of acts 900 include an act 902 of rejecting requests to join an online mode. In particular, the act 902 can include rejecting requests from a set of provider devices to join an online mode for a dynamic transportation matching system within a geographical area. Moreover, the act 902 can include identifying a set of provider devices rejected by the dynamic transportation matching system. Furthermore, as shown in FIG. 9, the series of acts 900 include an act 904 of identifying (at a time instance) a number of surplus provider device slots. In particular, the act 904 can include identifying a number of surplus provider device slots for an online mode within the geographical area. In addition, the act 904 can include identifying a number of surplus provider device slots based on provider device idle times and provider device pickup travel times corresponding to a geographical area.

Moreover, as shown in FIG. 9, the series of acts 900 include an act 906 of selecting a subset of provider devices to invite to join an online mode. In particular, the act 906 can include, in response to determining that a number of surplus provider device slots satisfies a surplus slot threshold, identifying a set of provider devices rejected by the dynamic transportation matching system. In addition, the act 906 can include selecting, from a set of provider devices, a subset of provider devices based on a number of surplus provider device slots (where the subset of provider devices are rejected within a threshold rejection time span prior to a time instance). Furthermore, the act 906 can include selecting, from the set of provider devices, a subset of provider devices by utilizing a threshold rejection time span and the number of surplus provider device slots. Additionally, the act 906 can include selecting a subset of provider devices from a set of provider devices by selecting particular provider devices corresponding to requests that were rejected within a threshold rejection time span.

Furthermore, the act 906 can include selecting a subset of provider devices (to invite to join an online mode) from the set of provider devices by identifying a last known location for a particular provider device and selecting the particular provider device for a subset of provider devices upon determining that the last known location is within a geographical area and was received within a threshold time span. Moreover, the act 906 can include determining a number of provider devices to invite to join the online mode by utilizing a throughput rate reflecting a probability of a provider device interacting with a digital invitation to join the online mode and selecting a subset of provider devices (to invite to join the online mode) to reflect the number of provider devices to invite for the online mode. Furthermore, the act 906 can include adjusting a number of provider devices to invite to join the online mode by discounting the number of provider devices using a utilization-efficiency-buffer value and selecting a subset of provider devices (to invite to join the online mode) to reflect the (adjusted) number of provider devices to invite for the online mode. Additionally, the act 906 can include monitoring one or more user interactions with a digital invitation to join an online mode within a geographical area, determining a modified throughput rate based on the one or more user interactions, determining an adjusted number of provider devices to invite for the online mode by applying the modified throughput rate, and selecting a subset of provider devices (to invite to join an online mode) to reflect the adjusted number of provider devices to invite to join the online mode.

Moreover, the act 906 can include determining a threshold selection score by mapping the number of surplus provider device slots to a score threshold-surplus slot model. Additionally, the act 906 can include determining selection scores for a set of provider devices based on provider device performance metrics determined from monitored activity. Furthermore, the act 906 can include selecting a subset of provider devices (to invite to join an online mode) from a set of provider devices, to satisfy a number of surplus provider device slots, by comparing selection scores associated with a set of provider devices to a threshold selection score (from a score threshold-surplus slot model).

In addition, the act 906 can include monitoring activity corresponding to a set of provider devices. Moreover, the act 906 can include determining, based on monitored activity, provider device performance metrics corresponding to a set of provider devices. Furthermore, the act 906 can include selecting a subset of provider devices (to invite to join an online mode) from a set of provider devices, to satisfy a number of surplus provider device slots, by comparing provider device performance metrics associated with the set of provider devices.

Additionally, as shown in FIG. 9, the series of acts 900 include an act 908 of transmitting digital invitations for an online mode. In particular, the act 908 can include transmitting a digital invitation, to a subset of provider devices, to join an online mode within a geographical area. Furthermore, the act 908 can include reserving, for a subset of provider devices, a number of surplus provider device slots for a threshold reservation time. In addition, the act 908 can include transmitting a digital invitation for display (e.g., as a push notification) within a subset of provider devices. Moreover, the act 908 can include, in response to receiving an indication of a user interaction with a digital invitation (e.g., with a push notification) from a particular provider device, switching the particular provider device from an offline mode to the online mode within a geographical area.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
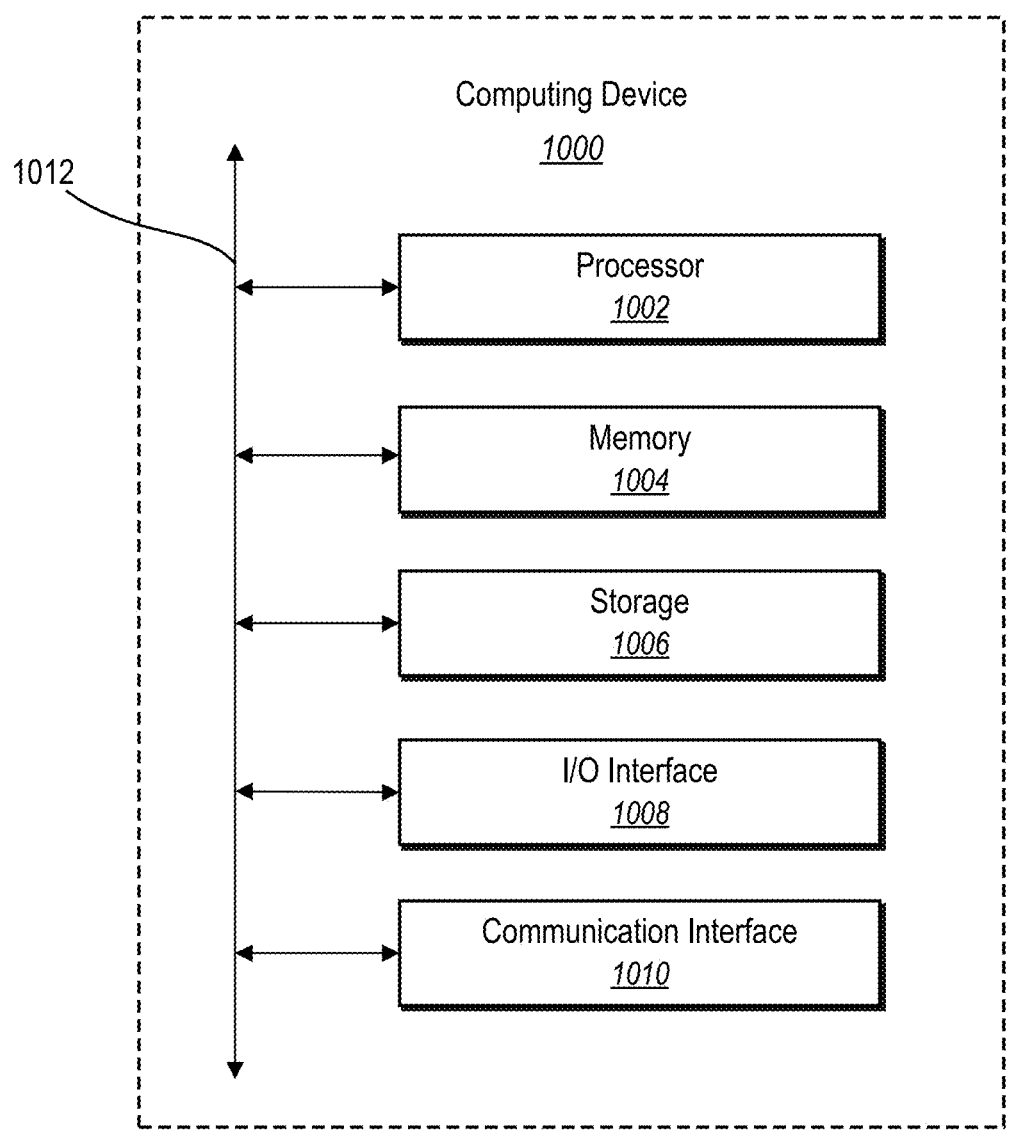
FIG. 10 illustrates a block diagram of a computing device in accordance with one or more embodiments.

FIG. 10 illustrates, in block diagram form, an exemplary computing device 1000 that may be configured to perform one or more of the processes described above. One will appreciate that the provider dispatch control system 106 (or the dynamic transportation matching system 104) can comprise implementations of the computing device 1000, including, but not limited to, the devices or systems illustrated in the previous figures. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive ("HDD"), flash memory, a Universal Serial Bus ("USB") drive or a combination of these or other storage devices.

The computing device 1000 also includes one or more input or output ("I/O") interface 1008, which are provided to allow a user (e.g., requester or provider) to provide input to (such as user strokes), receive output from, and otherwise transfer data to and from the computing device 1000. These I/O interface 1008 may include a mouse, keypad or a keyboard, a touch screen, camera, optical scanner, network interface, modem, other known I/O devices or a combination of such I/O interface 1008. The touch screen may be activated with a stylus or a finger.

The I/O interface 1008 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can comprise hardware, software, or both that couples components of computing device 1000 to each other.

Figure 11:
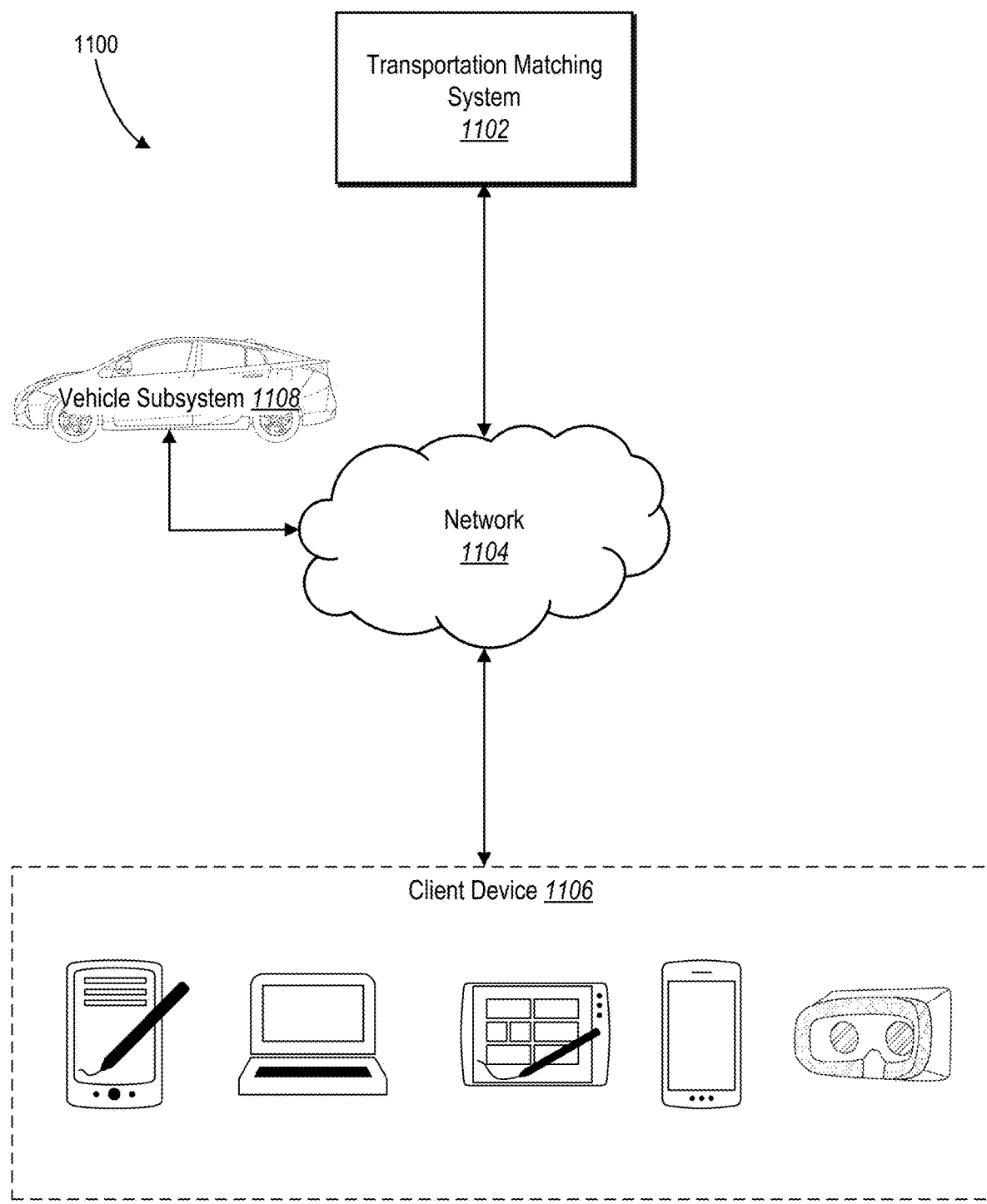
FIG. 11 illustrates an example environment for a transportation matching system in accordance with one or more embodiments.

FIG. 11 illustrates an example network environment 1100 of a transportation matching system 1102 (e.g., the dynamic transportation matching system 104). The network environment 1100 includes a client device 1106, a transportation matching system 1102, and a vehicle subsystem 1108 connected to each other by a network 1104. Although FIG. 11 illustrates a particular arrangement of the client device 1106, transportation matching system 1102, vehicle subsystem 1108, and network 1104, this disclosure contemplates any suitable arrangement of client device 1106, transportation matching system 1102, vehicle subsystem 1108, and network 1104. As an example, and not by way of limitation, two or more of client device 1106, transportation matching system 1102, and vehicle subsystem 1108 communicate directly, bypassing network 1104. As another example, two or more of client device 1106, transportation matching system 1102, and vehicle subsystem 1108 may be physically or logically co-located with each other in whole or in part. Moreover, although FIG. 11 illustrates a particular number of client devices 1106, transportation matching systems 1102, vehicle subsystems 1108, and networks 1104, this disclosure contemplates any suitable number of client devices 1106, transportation matching systems 1102, vehicle subsystems 1108, and networks 1104. As an example, and not by way of limitation, network environment 1100 may include multiple client device 1106, transportation matching systems 1102, vehicle subsystems 1108, and networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, transportation matching system 1102, and vehicle subsystem 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at client device 1106 to access network 1104. A client device 1106 may enable its user to communicate with other users at other client devices 1106.

In particular embodiments, client device 1106 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1106 one or more Hyper Text Markup Language ("HTML") files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1102 may be a network-addressable computing system that can host a transportation matching network. Transportation matching system 1102 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 1102. In addition, the transportation matching system may manage identities of service requesters such as users/requesters. In particular, the transportation matching system 1102 may maintain requester data such as driving/riding histories, personal data, or other user data in addition to navigation and/or traffic management services or other location services (e.g., GPS services).

In particular embodiments, the transportation matching system 1102 may manage transportation matching services to connect a user/requester with a vehicle and/or provider. By managing the transportation matching services, the transportation matching system 1102 can manage the distribution and allocation of resources from the vehicle subsystem 1108 and user resources such as GPS location and availability indicators, as described herein.

Transportation matching system 1102 may be accessed by the other components of network environment 1100 either directly or via network 1104. In particular embodiments, transportation matching system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1102 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or a transportation matching system 1102 to manage, retrieve, modify, add, or delete, the information stored in data store.

In particular embodiments, transportation matching system 1102 may provide users with the ability to take actions on various types of items or objects, supported by transportation matching system 1102. As an example, and not by way of limitation, the items and objects may include transportation matching networks to which users of transportation matching system 1102 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1102 or by an external system of a third-party system, which is separate from transportation matching system 1102 and coupled to transportation matching system 1102 via a network 1104.

In particular embodiments, transportation matching system 1102 may be capable of linking a variety of entities. As an example, and not by way of limitation, transportation matching system 1102 may enable users to interact with each other or other entities, or to allow users to interact with these entities through an application programming interfaces ("API") or other communication channels.

In particular embodiments, transportation matching system 1102 may include a variety of servers, sub-systems, programs, modules, logs, and data stores. In particular embodiments, transportation matching system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1102 may also include suitable components such as network interfaces, security mechanisms, load balancers, failover servers, management-and-network-operations consoles, other suitable components, or any suitable combination thereof. In particular embodiments, transportation matching system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1102 and one or more client devices 1106. An action logger may be used to receive communications from a web server about a user's actions on or off transportation matching system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of transportation matching system 1102. A privacy setting of a user determines how particular information associated with a user can be shared. The authorization server may allow users to opt in to or opt out of having their actions logged by transportation matching system 1102 or shared with other systems, such as, for example, by setting appropriate privacy settings. Third-party-content-object stores may be used to store content objects received from third parties. Location stores may be used for storing location information received from client devices 1106 associated with users.

In addition, the vehicle subsystem 1108 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1108 can include an autonomous vehicle—i.e., a vehicle that does not require a human operator. In these embodiments, the vehicle subsystem 1108 can perform maneuvers, communicate, and otherwise function without the aid of a human provider, in accordance with available technology.

In particular embodiments, the vehicle subsystem 1108 may include one or more sensors incorporated therein or associated thereto. For example, sensor(s) can be mounted on the top of the vehicle subsystem 1108 or else can be located within the interior of the vehicle subsystem 1108. In certain embodiments, the sensor(s) can be located in multiple areas at once—i.e., split up throughout the vehicle subsystem 1108 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1108 may include a communication device capable of communicating with the client device 1106 and/or the transportation matching system 1102. For example, the vehicle subsystem 1108 can include an on-board computing device communicatively linked to the network 1104 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   modifying parameters of a neural network prediction model to train the neural network prediction model to determine online mode slots within geographical areas by utilizing predicted output online mode slots and ground truth historical provider device activity data and ground truth historical requestor device activity data;
   receiving idle times from provider devices, pickup travel times from the provider devices, active transport utilization times from the provider devices, and requestor device activity from requestor devices within a geographical area;
   utilizing the neural network prediction model with the idle times, the pickup travel times, the active transport utilization times, and the requestor device activity to determine, at a first time instance, a number of predicted online mode slots accessible within the geographical area;
   receiving one or more online mode join requests from a set of provider devices within the geographical area;
   selecting a subset of provider devices for the number of predicted online model slots by:
     determining selection scores corresponding to the set of provider devices based on analyzing performance metrics of the set of provider devices utilizing a selection score machine learning model;
     determining a threshold selection score by utilizing a score threshold-surplus slot model that controls a selection score sensitivity for joining the online mode slots; and
     selecting a provider device for the number of predicted online mode slots based on a comparison between the threshold selection score and the selection scores corresponding to the set of provider devices;
   based on the number of predicted online mode slots accessible within the geographical area being filled, rejecting one or more provider devices from the set of provider devices to:
     generate a set of previously rejected provider devices with tracked rejection times that indicate a time of rejection to join the number of predicted online mode slots; and
     automatically switch one or more rejected provider devices in the set of previously rejected provider devices to an offline mode to prohibit transmission of transportation requests from the geographical area within transportation matching applications of the one or more rejected provider devices to balance a network of the provider devices and the requestor devices in the geographical area;
   receiving updated idle times from the provider devices, updated pickup travel times from the provider devices, updated active transport utilization times from the provider devices, and updated requestor device activity of the requestor devices within the geographical area;
   utilizing the neural network prediction model with the updated idle times, the updated pickup travel times, the updated active transport utilization times, and the updated requestor device activity to determine, at a second time instance, a number of predicted surplus provider device online mode slots indicating a change in the number of predicted online mode slots accessible to additional offline provider devices to join an online mode and access the transportation requests on a dynamic transportation matching system within the geographical area at the second time instance;
   based on the number of predicted surplus provider device online mode slots from the neural network prediction model, selecting, from the set of previously rejected provider devices with the tracked rejection times, a subset of previously rejected provider devices comprising rejection times within a threshold rejection time span prior to the second time instance to fill the number of predicted surplus provider device online mode slots reflecting a change in the balance of the network of the provider devices and the requestor devices in the geographical area;
   transmitting a digital invitation, to the subset of previously rejected provider devices, to join the online mode within the geographical area;

based on receiving a user interaction with the digital invitation from a previously rejected provider device from the subset of previously rejected provider devices, switching the previously rejected provider device to the online mode to enable transmission of a transportation request within the geographical area at the second time instance on a transportation matching application of the previously rejected provider device; and transmitting the transportation request to the previously rejected provider device to cause the previously rejected provider device to display, within a map interface of the transportation matching application, electronic navigational information indicating a route to a pickup location corresponding to the transportation request.

2. The computer-implemented method of claim 1, further comprising receiving a number of requestor devices active within the geographical area as the requestor device activity.

3. The computer-implemented method of claim 1, further comprising selecting the subset of previously rejected provider devices from the set of previously rejected provider devices by:

identifying a last known location for a particular provider device; and selecting the particular provider device for the subset of previously rejected provider devices upon determining that the last known location is within the geographical area and was received within the threshold rejection time span.

4. The computer-implemented method of claim 1, further comprising:

monitoring activity corresponding to the set of previously rejected provider devices;

determining, based on the monitored activity, provider device performance metrics corresponding to the set of previously rejected provider devices; and selecting the subset of previously rejected provider devices to fill the number of predicted surplus provider device online mode slots based on the provider device performance metrics associated with the subset of previously rejected provider devices.

5. The computer-implemented method of claim 1, further comprising:

determining a number of provider devices to invite to join the online mode by utilizing a throughput rate reflecting a probability of a provider device interacting with the digital invitation to join the online mode; and selecting the subset of previously rejected provider devices from the set of previously rejected provider devices to reflect the number of provider devices to invite for the online mode.

6. The computer-implemented method of claim 1, further comprising:

determining a threshold reservation time to join the online mode via the digital invitation for the subset of previously rejected provider devices; and transmitting the digital invitation for display as a push notification indicating the threshold reservation time and a selectable option to join the online mode within the subset of previously rejected provider devices.

7. The computer-implemented method of claim 1, further comprising:

determining the threshold selection score by generating, utilizing the score threshold-surplus slot model, a dynamic threshold selection score based on a number of remaining predicted online mode slots; and selecting the provider device for the number of predicted online mode slots by comparing a selection score corresponding to the provider device to the dynamic threshold selection score.

8. The computer-implemented method of claim 1, further comprising utilizing the neural network prediction model to determine, at multiple time instances, multiple numbers of surplus provider device online mode slots to determine the number of surplus provider device online mode slots across a time span utilizing real-time provider device activity data and real time requestor device activity within the geographical area.

9. A non-transitory computer-readable medium storing instructions that, when executed by at least one processor, cause a computer device to:

modify parameters of a neural network prediction model to train the neural network prediction model to determine online mode slots within geographical areas by utilizing predicted output online mode slots and ground truth by utilizing predicted output online mode slots and ground truth historical provider device activity data and ground truth historical requestor device activity data;

receive idle times from provider devices, pickup travel times from the provider devices, active transport utilization times from the provider devices, and requestor device activity from requestor devices within a geographical area;

utilize the neural network prediction model with the idle times, the pickup travel times, the active transport utilization times, and the requestor device activity to determine, at a first time instance, a number of predicted online mode slots accessible within the geographical area;

receive one or more online mode join requests from a set of provider devices within the geographical area;

select a subset of provider devices for the number of predicted online mode slots by:

determining selection scores corresponding to the set of provider devices based on analyzing performance metrics of the set of provider devices utilizing a selection score machine learning model;

determining a threshold selection score by utilizing a score threshold-surplus slot model that controls a selection score sensitivity for joining the online mode slots; and selecting a provider device for the number of predicted online mode slots based on a comparison between the threshold selection score and the selection scores corresponding to the set of provider devices;

based on the number of predicted online mode slots accessible within the geographical area being filled, reject one or more provider devices from the set of provider devices to:

generate a set of previously rejected provider devices with tracked rejection times that indicate a time of rejection to join the number of predicted online mode slots; and automatically switch one or more rejected provider devices in the set of previously rejected provider devices to an offline mode to prohibit transmission of transportation requests from the geographical area within transportation matching applications of the one or more rejected provider devices to balance a network of the provider devices and the requestor devices in the geographical area;

receive updated idle times from the provider devices, updated pickup travel times from the provider devices, updated active transport utilization times from the provider devices, and updated requestor device activity of the requestor devices within the geographical area;

utilize the neural network prediction model with the updated idle times, the updated pickup travel times, the updated active transport utilization times, and the updated requestor device activity to determine, at a second time instance, a number of predicted surplus provider device online mode slots indicating a change in the number of predicted online mode slots accessible to additional offline provider devices to join an online mode and access the transportation requests on a dynamic transportation matching system within the geographical area at the second time instance;

based on the number of predicted surplus provider device online mode slots from the neural network prediction model, select, from the set of previously rejected provider devices with the tracked rejection times, a subset of previously rejected provider devices comprising rejection times within a threshold rejection time span prior to the second time instance to fill the number of predicted surplus provider device online mode slots reflecting a change in the balance of the network of the provider devices and the requestor devices in the geographical area;

transmit a digital invitation, to the subset of previously rejected provider devices, to join the online mode within the geographical area;

based on receiving a user interaction with the digital invitation from a previously rejected provider device from the subset of previously rejected provider devices, switch the previously rejected provider device to the online mode to enable transmission of a transportation request within the geographical area at the second time instance on a transportation matching application of the previously rejected provider device; and transmit the transportation request to the previously rejected provider device to cause the previously rejected provider device to display, within a map interface of the transportation matching application, electronic navigational information indicating a route to a pickup location corresponding to the transportation request.

10. The non-transitory computer-readable medium of claim 9, further comprising instructions that, when executed by the at least one processor, cause the computer device to select the subset of previously rejected provider devices from the set of previously rejected provider devices by:
identifying a last known location for a particular provider device; and
selecting the particular provider device for the subset of previously rejected provider devices upon determining that the last known location is within the geographical area and was received within the threshold rejection time span.

11. The non-transitory computer-readable medium of claim 9, further comprising instructions that, when executed by the at least one processor, cause the computer device to select the subset of previously rejected provider devices from the set of previously rejected provider devices by:
monitoring activity corresponding to the set of previously rejected provider devices;
determining, based on the monitored activity, provider device performance metrics corresponding to the set of previously rejected provider devices; and
selecting the subset of previously rejected provider devices from to fill the number of predicted surplus provider device online mode slots based on the provider device performance metrics associated with the subset of previously rejected provider devices.

12. The non-transitory computer-readable medium of claim 9, further comprising instructions that, when executed by the at least one processor, cause the computer device to:
determine a number of provider devices to invite to join the online mode by:
utilizing a throughput rate reflecting a probability of a provider device interacting with the digital invitation to join the online mode; and
adjusting the number of provider devices to invite to join the online mode by discounting the number of provider devices using a utilization-efficiency-buffer value; and
select the subset of previously rejected provider devices from the set of previously rejected provider devices to reflect the number of provider devices to invite for the online mode.

13. The non-transitory computer-readable medium of claim 9, further comprising instructions that, when executed by the at least one processor, cause the computer device to:
determine a number of provider devices to invite to join the online mode by utilizing a throughput rate reflecting a probability of a provider device interacting with the digital invitation to join the online mode;
monitor one or more user interactions with the digital invitation to join the online mode within the geographical area;
determine a modified throughput rate based on the one or more user interactions;
determine an adjusted number of provider devices to invite for the online mode by applying the modified throughput rate; and
select the subset of previously rejected provider devices to reflect the adjusted number of provider devices to invite to join the online mode.

14. The non-transitory computer-readable medium of claim 9, further comprising instructions that, when executed by the at least one processor, cause the computer device to:
determine an additional threshold selection score by mapping the number of predicted surplus provider device online mode slots to the score threshold-surplus slot model;
monitor activity corresponding to the set of previously rejected provider devices;
determine additional selection scores for the set of previously rejected provider devices based on provider device performance metrics determined from the monitored activity; and
select the subset of previously rejected provider devices from the set of previously rejected provider devices, to satisfy the number of predicted surplus provider device online mode slots, by comparing the additional selection scores associated with the set of previously rejected provider devices to the additional threshold selection score.

15. The non-transitory computer-readable medium of claim 9, further comprising instructions that, when executed by the at least one processor, cause the computer device to transmit the digital invitation for display within the subset of previously rejected provider devices to display a selectable option to enable the online mode and a remaining amount of time the digital invitation will remain accessible.

16. A system comprising:
one or more memory devices; and
one or more computing devices configured to:
- modify parameters of a neural network prediction model to train the neural network prediction model to determine online mode slots within geographical areas by utilizing predicted output online mode slots and ground truth by utilizing predicted output online mode slots and ground truth by utilizing predicted output online mode slots and ground truth historical provider device activity data and ground truth historical requestor device activity data;
- receive idle times from provider devices, pickup travel times from the provider devices, active transport utilization times from the provider devices, and requestor device activity from requestor devices within a geographical area;
- utilize the neural network prediction model with the idle times, the pickup travel times, the active transport utilization times, and the requestor device activity to determine, at a first time instance, a number of predicted online mode slots accessible within the geographical area;
- receive one or more online mode join requests from a set of provider devices within the geographical area;
- select a subset of provider devices for the number of predicted online mode slots by:
  - determining selection scores corresponding to the set of provider devices based on analyzing performance metrics of the set of provider devices utilizing a selection score machine learning model;
  - determining a threshold selection score by utilizing a score threshold-surplus slot model that controls a selection score sensitivity for joining the online mode slots; and
  - selecting a provider device for the number of predicted online mode slots based on a comparison between the threshold selection score and the selection scores corresponding to the set of provider devices;
- based on the number of predicted online mode slots accessible within the geographical area being filled, reject one or more provider devices from the set of provider devices to:
  - generate a set of previously rejected provider devices with tracked rejection times that indicate a time of rejection to join the number of predicted online mode slots; and
  - automatically switch one or more rejected provider devices in the set of previously rejected provider devices to an offline mode to prohibit transmission of transportation requests from the geographical area within transportation matching applications of the one or more rejected provider devices to balance a network of the provider devices and the requestor devices in the geographical area;
- receive updated idle times from the provider devices, updated pickup travel times from the provider devices, updated active transport utilization times from the provider devices, and updated requestor device activity of the requestor devices within the geographical area;
- utilize the neural network prediction model with the updated idle times, the updated pickup travel times, the updated active transport utilization times, and the updated requestor device activity to determine, at a second time instance, a number of predicted surplus provider device online mode slots indicating a change in the number of predicted online mode slots accessible to additional offline provider devices to join an online mode and access the transportation requests on a dynamic transportation matching system within the geographical area at the second time instance;
- based on the number of predicted surplus provider device online mode slots from the neural network prediction model, select, from the set of previously rejected provider devices with the tracked rejection times, a subset of previously rejected provider devices comprising rejection times within a threshold rejection time span prior to the second time instance to fill the number of predicted surplus provider device online mode slots reflecting a change in the balance of the network of the provider devices and the requestor devices in the geographical area;
- transmit a digital invitation, to the subset of previously rejected provider devices, to join the online mode within the geographical area;
- based on receiving a user interaction with the digital invitation from a previously rejected provider device from the subset of previously rejected provider devices, switch the previously rejected provider device to the online mode to enable transmission of a transportation request within the geographical area at the second time instance on a transportation matching application of the previously rejected provider device; and
- transmit the transportation request to the previously rejected provider device to cause the previously rejected provider device to display, within a map interface of the transportation matching application, electronic navigational information indicating a route to a pickup location corresponding to the transportation request.

17. The system of claim 16, wherein the one or more computing devices are further configured to:
- identify a last known location for a particular provider device; and
- select the particular provider device for the subset of previously rejected provider devices upon determining that the last known location is within the geographical area.

18. The system of claim 16, wherein the one or more computing devices are further configured to:
- monitor activity corresponding to the set of previously rejected provider devices;
- determine, based on the monitored activity, provider device performance metrics corresponding to the set of previously rejected provider devices; and
- select the subset of previously rejected provider devices to fill the number of predicted surplus provider device online mode slots, based on the provider device performance metrics associated with the subset of previously rejected provider devices.

19. The system of claim 16, wherein the one or more computing devices are further configured to:
- determine a number of provider devices to invite to join the online mode by:
  - utilizing a throughput rate reflecting a probability of a provider device interacting with the digital invitation to join the online mode; and adjusting the number of provider devices to invite to join the online mode by discounting the number of provider devices using a utilization-efficiency-buffer value; and select the subset of previously rejected provider devices from the set of previously rejected provider devices to reflect the number of provider devices to invite for the online mode.

20. The system of claim 16, wherein the one or more computing devices are further configured to transmit the digital invitation for display as a push notification within the subset of previously rejected provider devices, wherein the push notification comprises a selectable option to enable the online mode and a remaining amount of time the digital invitation will remain accessible.

* * * * *